United States Patent [19]

Yoshida et al.

[11] Patent Number: 5,093,857
[45] Date of Patent: Mar. 3, 1992

[54] COMMUNICATION APPARATUS FOR SELECTED DATA AND SPEECH COMMUNICATION

[75] Inventors: Takehiro Yoshida, Tokyo; Kenzo Sakakibara; Kozo Toda, both of Yokohama, all of Japan

[73] Assignee: Canon Kabushiki Kaisha, Tokyo, Japan

[21] Appl. No.: 453,364

[22] Filed: Dec. 20, 1989

Related U.S. Application Data

[63] Continuation of Ser. No. 108,915, Oct. 15, 1987, abandoned.

[30] Foreign Application Priority Data

Oct. 17, 1986 [JP] Japan .................. 61-245326
Oct. 17, 1986 [JP] Japan .................. 61-245329
Dec. 16, 1986 [JP] Japan .................. 61-297582

[51] Int. Cl.⁵ .............................. H04N 1/32
[52] U.S. Cl. ........................ 379/100; 379/96; 358/434; 358/438
[58] Field of Search ............ 379/93, 94, 96, 100; 358/400, 434, 438

[56] References Cited

U.S. PATENT DOCUMENTS

| | | |
|---|---|---|
| 3,845,949 | 11/1974 | Acquaviva et al. |
| 4,086,443 | 4/1978 | Gorham et al. .................. 379/100 |
| 4,353,097 | 10/1982 | Takeda et al. |
| 4,419,697 | 12/1983 | Wada .................. 358/257 |
| 4,423,439 | 12/1983 | Watanabe .................. 358/287 |
| 4,549,044 | 10/1985 | Durham .................. 379/106 |
| 4,591,921 | 5/1986 | Nakajima .................. 358/257 |
| 4,660,218 | 4/1987 | Hashimoto .................. 379/93 |
| 4,668,994 | 5/1987 | Takahashi et al. .................. 358/256 |
| 4,677,660 | 6/1987 | Yoshida . |
| 4,679,093 | 7/1987 | Yaguchi .................. 358/257 |
| 4,717,967 | 1/1988 | Yoshida .................. 358/296 |
| 4,773,080 | 9/1988 | Nakajima et al. . |
| 4,800,439 | 1/1989 | Yoshino . |
| 4,815,121 | 3/1989 | Yoshida . |

FOREIGN PATENT DOCUMENTS

| | | |
|---|---|---|
| 0044261 | 4/1981 | Japan .................. 379/100 |
| 57-46569 | 3/1982 | Japan .................. 379/100 |
| 5742451 | 3/1982 | Japan . |
| 0090460 | 5/1985 | Japan .................. 379/106 |
| 0214676 | 10/1985 | Japan .................. 379/100 |
| 0232560 | 9/1988 | Japan .................. 379/100 |

Primary Examiner—James L. Dwyer
Assistant Examiner—Wing F. Chan
Attorney, Agent, or Firm—Fitzpatrick, Cella, Harper & Scinto

[57] ABSTRACT

A communication apparatus includes a facsimile system for performing data communication, a plurality of telephone sets for performing speech communication; and a control unit for controlling the facsimile system. Each telephone set includes a display unit for displaying a state of data communication. The control unit selectively sends information associated with the state of the facsimile system to the telephone sets to cause the display units to display the state of the facsimile system.

63 Claims, 14 Drawing Sheets

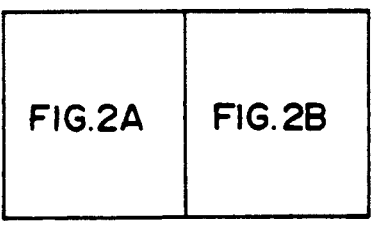
FIG.2A
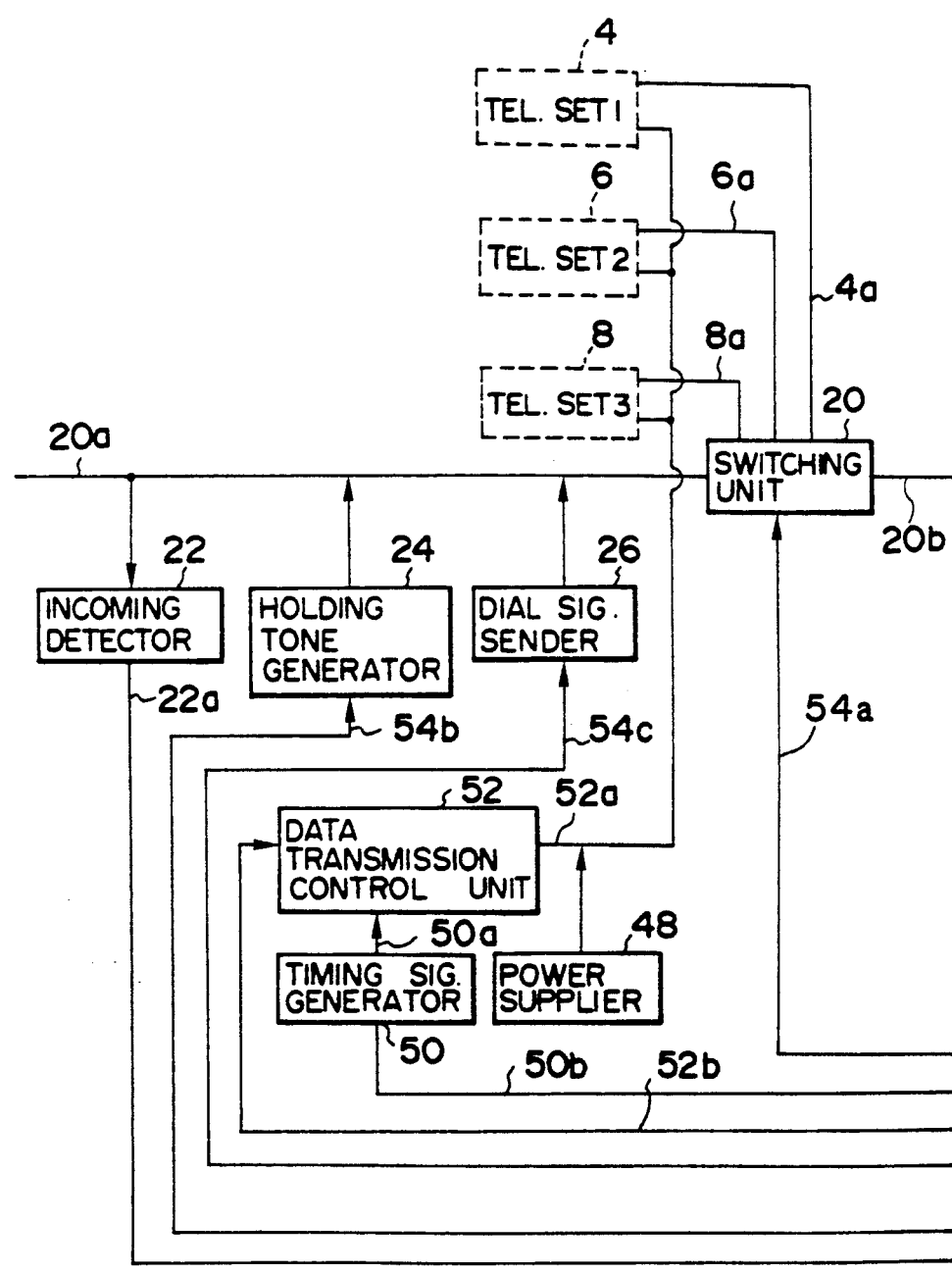

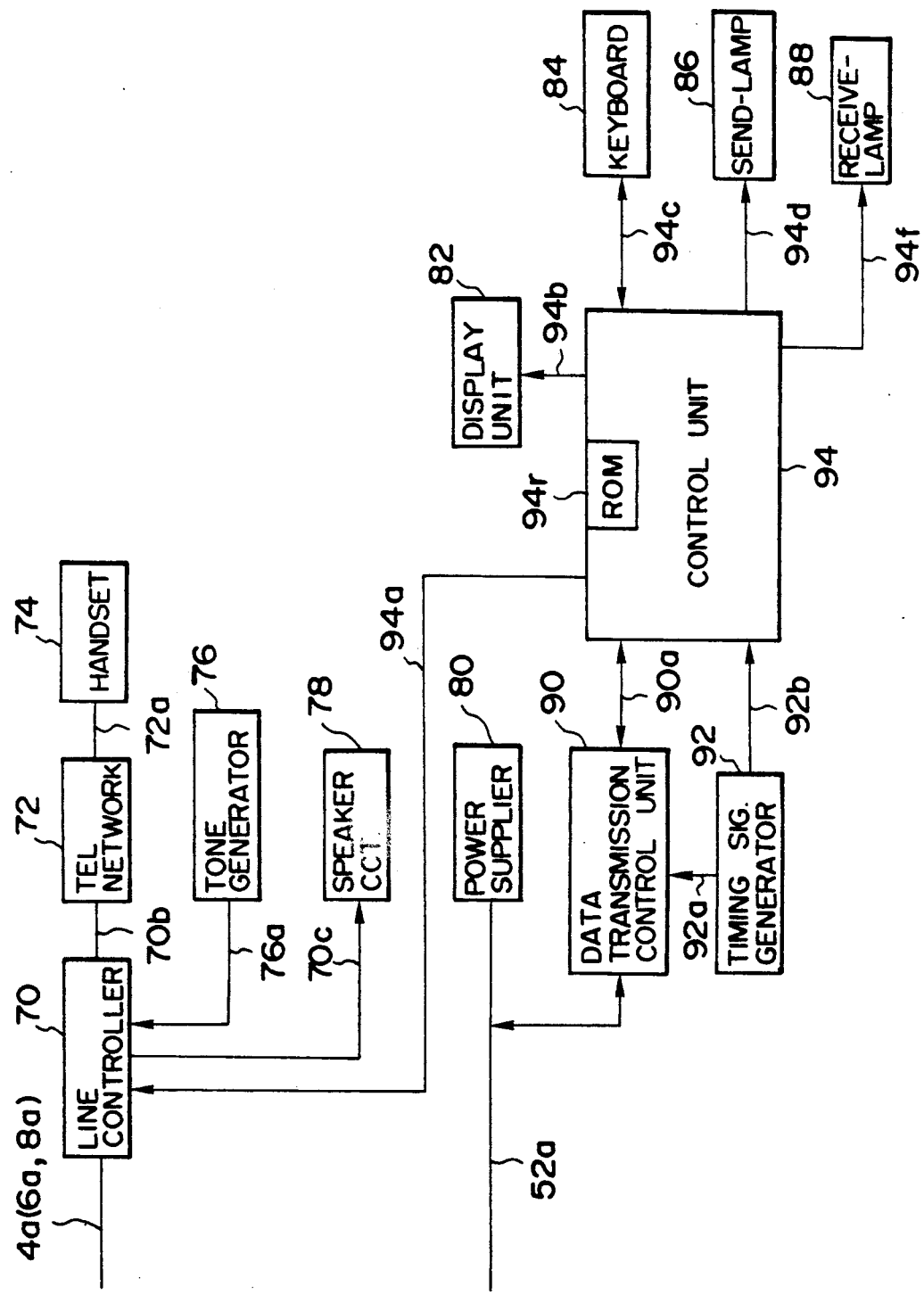

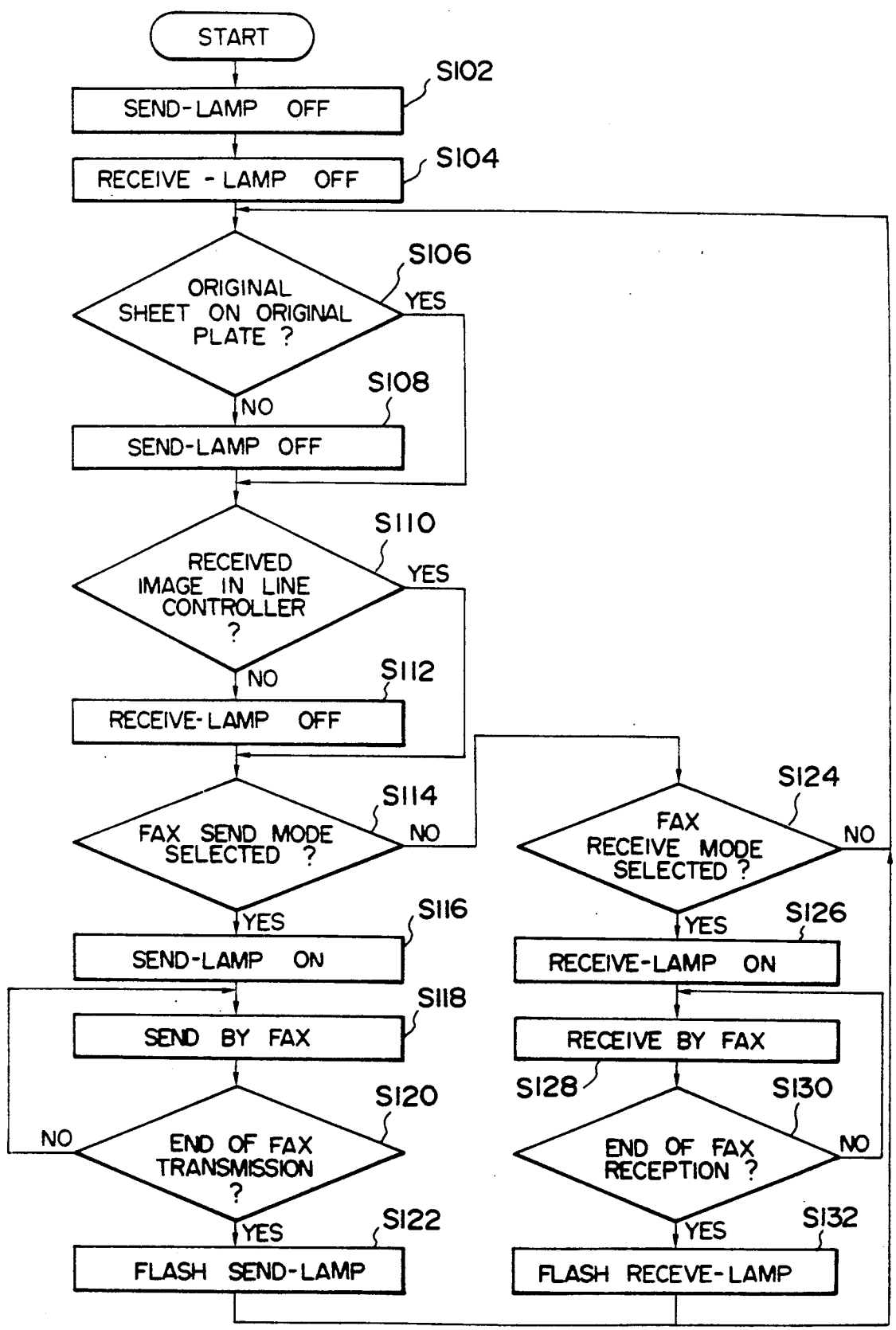

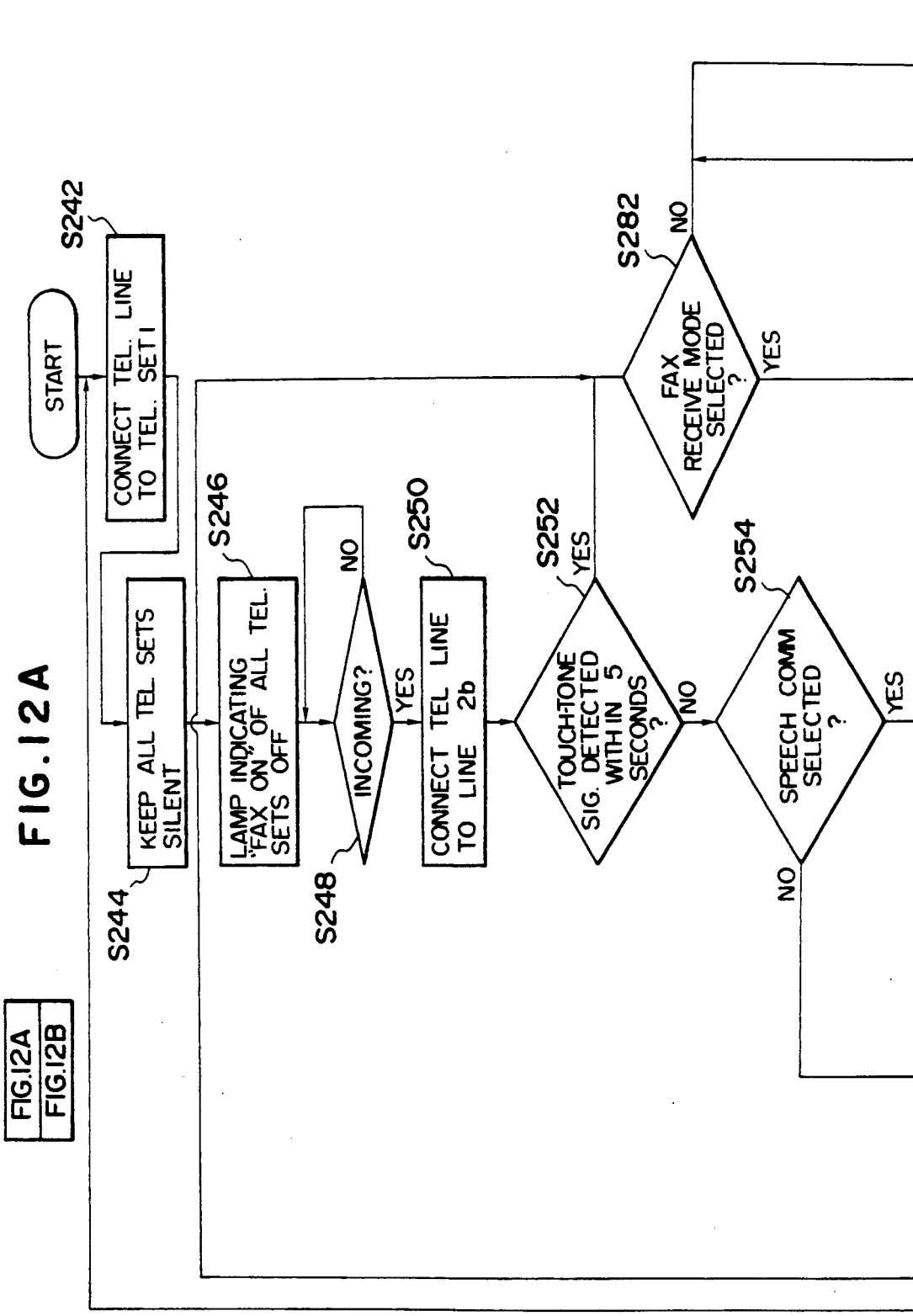

COMMUNICATION APPARATUS FOR SELECTED DATA AND SPEECH COMMUNICATION

This application is a continuation of application Ser. No. 108,915 filed Oct. 15, 1987, now abandoned.

BACKGROUND OF THE INVENTION

1. Field of the Invention

The present invention relates to a communication apparatus and, more particularly, to a communication apparatus realized such that a telephone set and a data communication apparatus for performing data communication using a predetermined scheme are connected to predetermined communication lines.

2. Related Background Art

A typical communication system of the type described above is a system in which a plurality of telephone sets and non-speech communication apparatuses such as facsimile systems are connected to a plurality of telephone lines, as shown in FIG. 6.

Referring to FIG. 6, two telephone lines (station lines) 2a and 2b are connected to main equipment 2. The main equipment 2 performs switching of three Touch-Tone Keypad phones 4, 6, and 8 and a fax machine 10 through the two telephone lines 2a and 2b.

The illustrated telephone set is not a device which cannot be coupled to the telephone lines to perform communication by itself, and circuits for controlling communication such as an incoming call and an outgoing call, a speech path, and a power supplier are included in the main equipment 2. Outgoing and incoming call control of each telephone set is automatically performed by the main equipment 2.

The fax machine 10 is a device which can be connected to the telephone lines to perform communication with other fax machines by itself. When the fax machine 10 is connected to the telephone lines together with the speech system comprising the Touch-Tone Keypad phones 4, 6, and 8 and the main equipment 2, a selector (not shown) is used to manually set the telephone mode or fax mode. A signal line 10a for connecting the fax machine 10 and the main equipment 2 comprise a pair of lines for communication. Each of signal lines 4a, 6a, and 8a for connecting the Touch-Tone Keypad phones and the main equipment 2 comprises a pair of speech lines and a pair of control power supply lines.

In the conventional system described above, the fax machine can be simply connected to the main equipment for the telephone sets. When the fax machine is not used, functions are limited such that an outgoing call can be made using fax communication lines. In addition, the fax machine itself can be connected to the station lines, and the system has a double line control function together with the control operation of the main equipment 2. As a result, the conventional communication system cannot be regarded as an economical system.

A functional relationship between the telephone system and the fax machine is not present at all. It is impossible to control the fax machine from the Touch-Tone Keypad phone. When an operator performs communication using the fax machine, he or she must leave his or her desk and go to the installation place of the fax machine. In order to check reception of image data or completion of sending by the fax machine, although the operator does not actually send information, he or she must go to the installation location of the fax machine.

The above problem is common in all data communication apparatuses in addition to the fax machine connected to the communication lines.

When a communication apparatus such as a fax machine is connected together with a plurality of telephone sets, only one fax machine receives all pieces of information. Therefore, the destinations of these pieces of information cannot be determined, and one of the operators must recover all recorded sheets and distribute them to the proper destinations.

The above problem can be solved by preparing fax machines to all staff or fax machines integral with telephone sets. However, even if a large number of fax machines are connected to a single speech path, communication cannot be performed simultaneously, thus imposing excessive investment on users.

The above situation cannot be improved even if the apparatus connected together with the telephone set is not a fax machine but a data terminal. It should be noted that U.S. patent application Ser. No. 823,286 filed by the present applicant describes a system in which two telephone sets and one fax machine are connected to two telephone lines.

SUMMARY OF THE INVENTION

It is an object of the present invention to improve a communication apparatus.

It is another object of the present invention to solve the conventional problems described above.

It is still another object of the present invention to display a state of a data communication apparatus on a telephone set.

It is still another object of the present invention to allow an operator remote from a data communication apparatus to know its operating state.

It is still another object of the present invention to output a communication state of a data communication apparatus to a telephone set.

It is still another object of the present invention to display a destination of data received by a data communication apparatus on a telephone set.

It is still another object of the present invention to display that a data receive mode corresponding to destinations of the received data is displayed on a telephone set.

The above and other objects, features, nd advantages of the present invention will be apparent from the following detailed description of preferred embodiments in conjunction with the accompanying drawings.

BRIEF DESCRIPTION OF THE DRAWINGS

FIGS. 2A and 2B are block diagrams showing parts of the detailed arrangement of the apparatus of the first embodiment;

FIG. 3 is a block diagram showing a telephone set shown in FIG. 2A;

FIG. 4 is a flow chart for explaining a control sequence of a control unit of the first embodiment;

FIGS. 12A and 12B are flow charts for explaining a control sequence of a control circuit of the third embodiment.

DETAILED DESCRIPTION OF THE PREFERRED EMBODIMENTS

Figure 1:
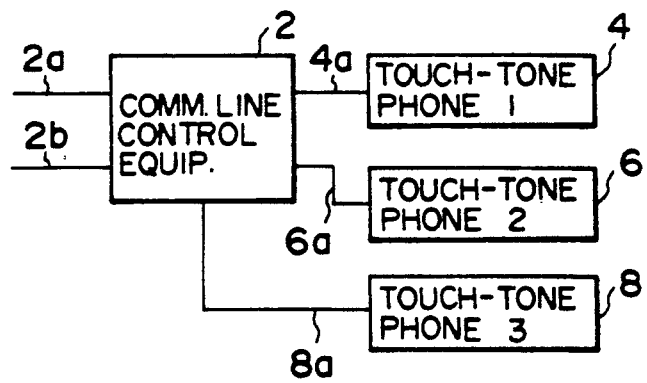
FIG. 1 is a schematic block diagram of a data communication apparatus according to a first embodiment of the present invention.

Preferred embodiments of the present invention will be described in detail with reference to the accompanying drawings.

In a communication system having one fax machine connected to a plurality of telephone sets according to a first embodiment of the present invention, a state of the fax machine is displayed on each telephone set.

The same reference numerals as in the prior art denote the same parts in the first embodiment, and a detailed description thereof will be omitted.

Figure 6:
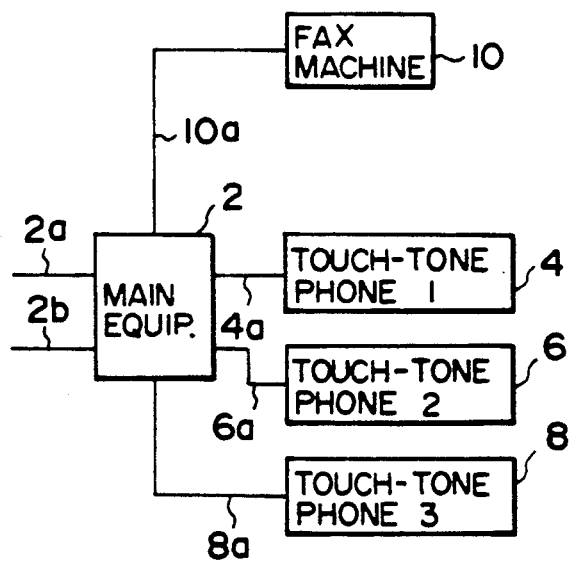
FIG. 6 is a block diagram showing a conventional communication system.

FIG. 1 is a block diagram of a communication system according to the first embodiment. Two telephone lines 2a and 2b are connected to communication line control equipment 2. In this embodiment, the communication line control equipment 2 is constituted together with a fax machine (other non-speech terminals may be used). The communication line control equipment 2 serves as a line control unit in the fax machine and also controls Touch-Tone Keypad phones 4, 6, and 8 in the same manner as the main equipment in FIG. 6. All operations of the Touch-Tone Keypad phone 4, such as office line outgoing calling, abbreviated dialing, on-hook dialing, hand-free speech, extension calling, and call transfer, as well as additional functions are controlled by a control unit (to be described later) in the fax machine in this embodiment.

Line control between the telephone set and the fax machine is performed by the common line control equipment. The functions of the fax machine and the telephone sets can be systematically coupled. For example, information obtained by the fax machine can be displayed on a display unit in the telephone set. The fax machine can be controlled by the telephone set.

Figure 2B:
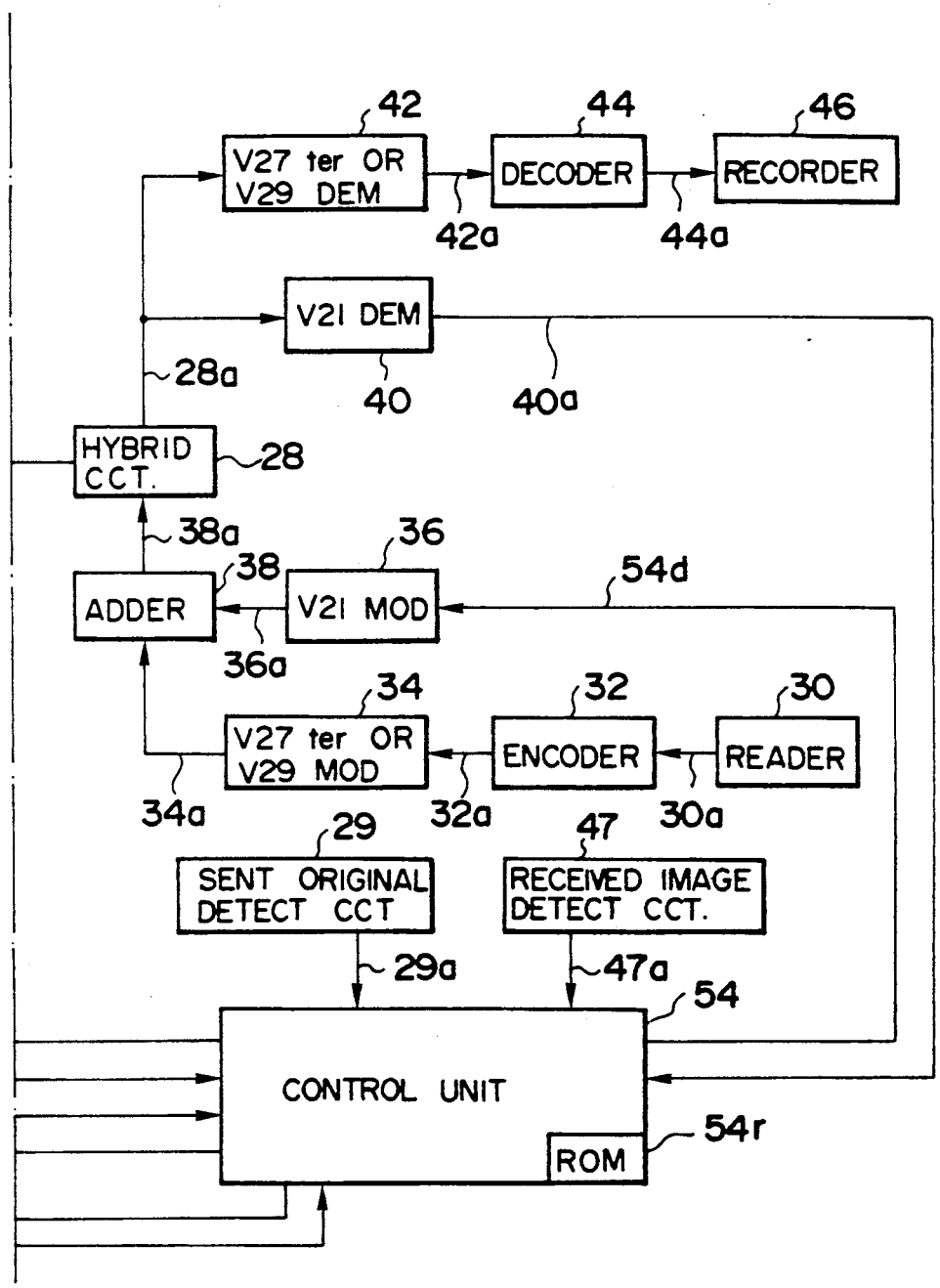

FIGS. 2A and 2B are detailed block diagram of the arrangement of FIG. 1.

Referring to FIG. 2A, a telephone line 20a is connected to a line switching unit 20 including an analog switch.

Telephone sets 4, 6, and 8 as speech terminals are connected to the line switching unit 20 through corresponding signal lines 4a, 6a, and 8a. A fax communication system including a hybrid circuit 28 and the subsequent circuits and serving as a nonspeech terminal is connected to the line switching unit 20 through a signal line 20b.

A control unit 54 controls switching of the line switching unit 20 through a signal line 54a. Data "0" to data "3" are sent to the line switching unit 20, and the line 20a is connected to the hybrid circuit 28 or the telephone set 4, 6, or 8 on the basis of the data values.

The control unit 54 controls the overall operations of the fax machine and the telephone sets on the basis of programs (to be described later) stored in a ROM 54r therein. The control unit 54 comprises a microcomputer, and its peripheral circuits such as the ROM 54r, a RAM, and an I/O port.

The fax machine including the hybrid circuit 28 and the subsequent circuits is arranged as follows.

The hybrid circuit 28 connected to the line switching unit 20 through the signal line 20b is used to separate the sending signal from the reception signal. The sending signal is input from a signal line 38a, and the reception signal is output through a signal line 28a. The sender system comprises an adder 38, a modulator 36, and an image signal sender including a reader 30, an encoder 32, and a V27 ter or V29 modulator 34.

The adder 38 serves to add procedure signals or image signals input from the modulators 36 and 34 through signal lines 34a and 36a.

The modulator 36 modulates the sending procedure signal input from the control unit 54 through a signal line 54d in accordance with a modulation scheme complying with CCITT Recommendation V21.

The reader 30 comprises a CCD sensor and the like, and the read image signal is sent to the encoder through a signal line 30a. The encoder 32 serves to suppress redundancy and compress the image signal in accordance with an MH (modified Huffman) or MR (modified READ) scheme. The compressed image signal is sent to the modulator 34 through a signal line 32a.

The modulator 34 modulates the image signal in accordance with a modulation scheme complying with CCITT Recommendations V27 ter. or V29.

A demodulator 40 connected to the signal line 28a demodulates the procedure signal demodulated by a scheme corresponding to the modulation scheme of the modulator 36. The demodulated procedure signal is input to the control unit 54 through a signal line 40a.

The received image signal is demodulated, decoded, and recorded by a demodulator 42, a decoder 44, and a recorder 46 constituting an image signal receiver unit.

The demodulator 42 demodulates the image signal by a demodulation scheme corresponding to the modulation scheme of the modulator 34. The demodulated signal is decoder 44 decodes the image signal according to the decoding scheme corresponding to the encoding scheme of the encoder 32. The decoded signal is input to the recorder 46 through a signal line 44a. The recorder 46 comprises a thermal printer or the like.

Line control of the fax machine and the telephone sets 4, 6, and 8 is performed by the blocks of the left half of FIG. 2 under the control of the control unit 54.

An incoming detector 22 serves to detect a predetermined signal such as a ringing signal and hence an incoming call. The incoming detector 22 is connected to the line 20a, and an incoming call detection signal is sent to the control unit 54 through a signal line 22a.

A holding tone generator 24 generates a tone signal representing a holding tone to a destination station through the line 20a. A dial signal sender 26 sends to the line 20a a dial signal having a predetermined format of a dial tone or pulse when the destination station is to be called. The holding tone generator 24 and the dial signal sender 26 are controlled by the control unit 54 through corresponding signal lines 54b and 54c.

Referring to FIG. 2, the signal lines 4a, 6a, and 8a are lines for sending the speech signal, unlike the conventional example. In this embodiment, the power is supplied from a power supplier 48 to the telephone sets 4, 6, and 8.

Data transmission for systematizing control of the telephone sets 4, 6, and 8 and the fax machine is controlled by a data transmission control unit 52 constituted by elements such as a PPI. Data exchange between the data transmission control unit 52 and the control unit 54 is performed through the signal line 52b. The transmission between the telephone sets 4, 6, and 8 and the data transmission control unit 52 and power supply thereto are controlled through signal lines 52a. The data transmission control unit 52 and the control unit 54 are operated in synchronism with clocks generated by a timing signal generator 50 comprising a clock generator and the like.

In the first embodiment, assume that information exchanged between the telephone set and the fax machine through the data communicating means is information associated with the fax communication state. In this embodiment, in particular, information representing that the receive image signal is actually received or all send originals are present in the original exhaust position is transferred to the telephone sets 4, 6, and 8 and is displayed thereon in order to explicitly indicate the end of fax communication.

The control unit 54 is connected to a sent original detect circuit 29 for detecting the presence/absence of a sent original, and a received image detect circuit 47 for detecting the presence/absence of a received image. A detection element such as a photosensor in the sent original detect circuit 29 is arranged in the original exhaust position of the reader 30. The received image detect circuit is arranged at the recorded sheet exhaust position of the recorder 46. When the received image is not recorded but stored in a memory or the like, the control unit 54 determines according to the state of the flag whether the received image is stored in the image memory, thereby obtaining the same function as the detect circuit 47.

Detection signals from the detect circuits 29 and 47 are transferred to the telephone sets 4, 6, and 8 through the data transmission control nit 52 and the signal line 52a and are displayed thereon.

FIG. 3 shows the internal arrangement of each of the telephone sets 4, 6, and 8. The signal line 4a (6a or 8a) connected to the line switching unit 20 shown in FIG. 2 is connected to a line controller 70. The line 4a (6a or 8a) is connected to a telephone network 72, and a speaker circuit 78 used for hands-free speech through signal lines 70b, 76a, and 70c.

The telephone network 72 includes an antiside-tone circuit and a speech network and is connected to a handset 74 through a signal line 72a. The data transfer and power supply signal lines 52a are connected to a data transmission control unit 90 and a power supplier 80 for supplying power to the respective circuits in the telephone set. The data transmission control unit 90 comprises elements such as a PPI in the same manner as in the data transmission control unit 52.

A control unit 94 including a microcomputer in the telephone set controls the entire operations of the telephone set. Data exchange between the data transmission control unit 90 and the control unit 94 is performed through a signal line 90a.

A keyboard 84 comprising a ten-key pad used for inputting a telephone number for an outgoing call is connected to the control unit 94 through a signal line 94c. A start/stop key used for remote-controlling a fax machine is arranged in the keyboard 84.

A display unit 82 comprising a liquid crystal display unit is connected to the control unit 94 through a signal line 94b to display telephone number data and data transferred from the fax machine through the signal line 52a. The display unit 82 can also be used to monitor the operation of the fax machine. For example, the telephone number and the user abbreviated name of the source station which are obtained during facsimile communication can be displayed on the display unit 82 through a signal line 52a. The display unit 82 is used to display both information associated with the operation of the telephone set and information associated with the operation of the fax machine. In order to display these pieces of information, a display area of the display unit 82 is divided into two regions or is used alternately for displaying two types of information.

In order to display the sent original detected by the fax machine, the presence/absence of the received image, and sending/receiving state, send- and receive-lamps 86 and 88 comprising light-emitting elements such as LED's are connected through signal lines 94d and 94f, respectively, to the control unit 94. The send-lamp 86 indicates the presence/absence of the sent original, and the receive-lamp 88 indicates the presence/absence of the received image.

Figure 5A:
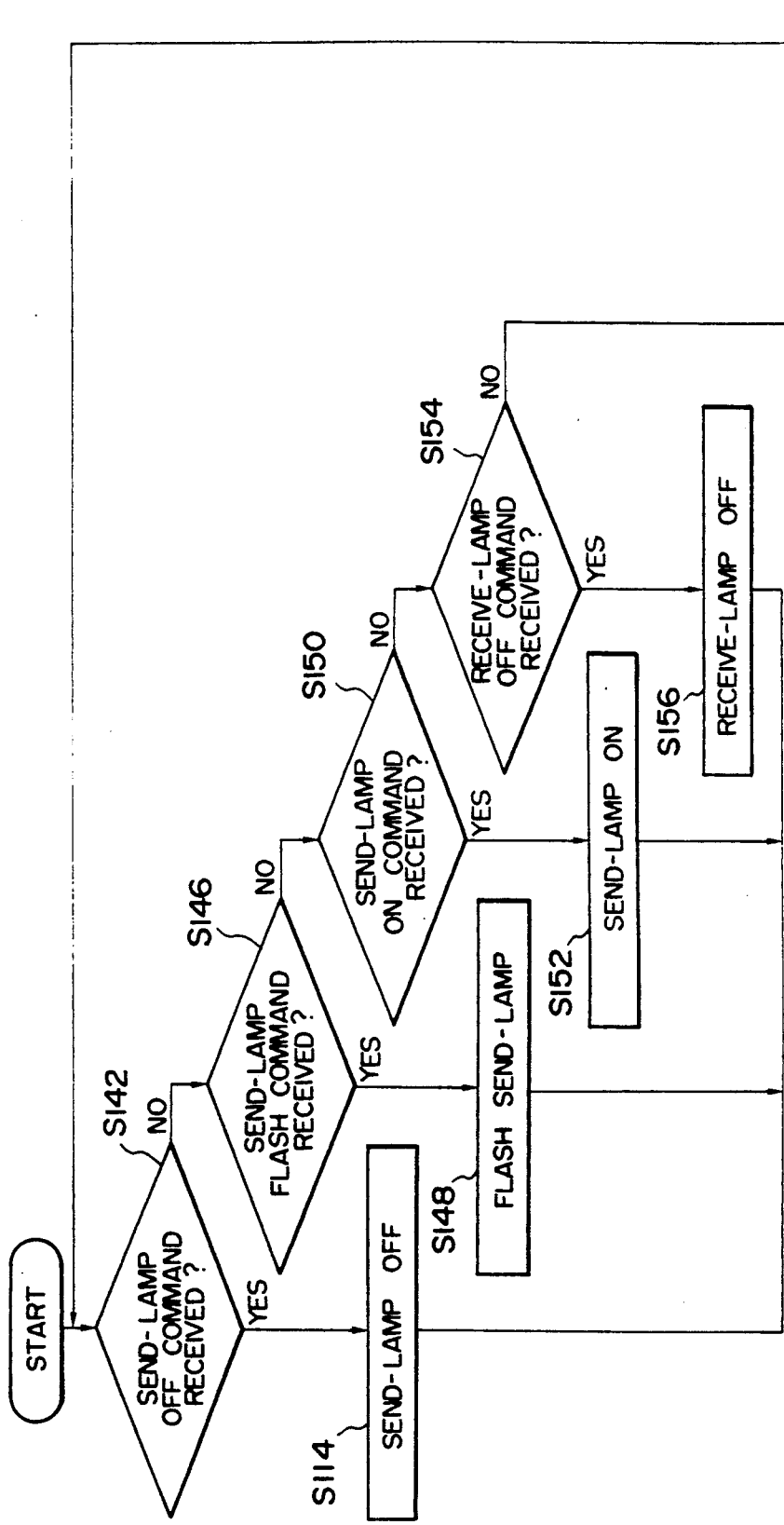
FIGS. 5A and 5B are flow charts for explaining a control sequence of a control unit in a telephone set.
Figure 5B:
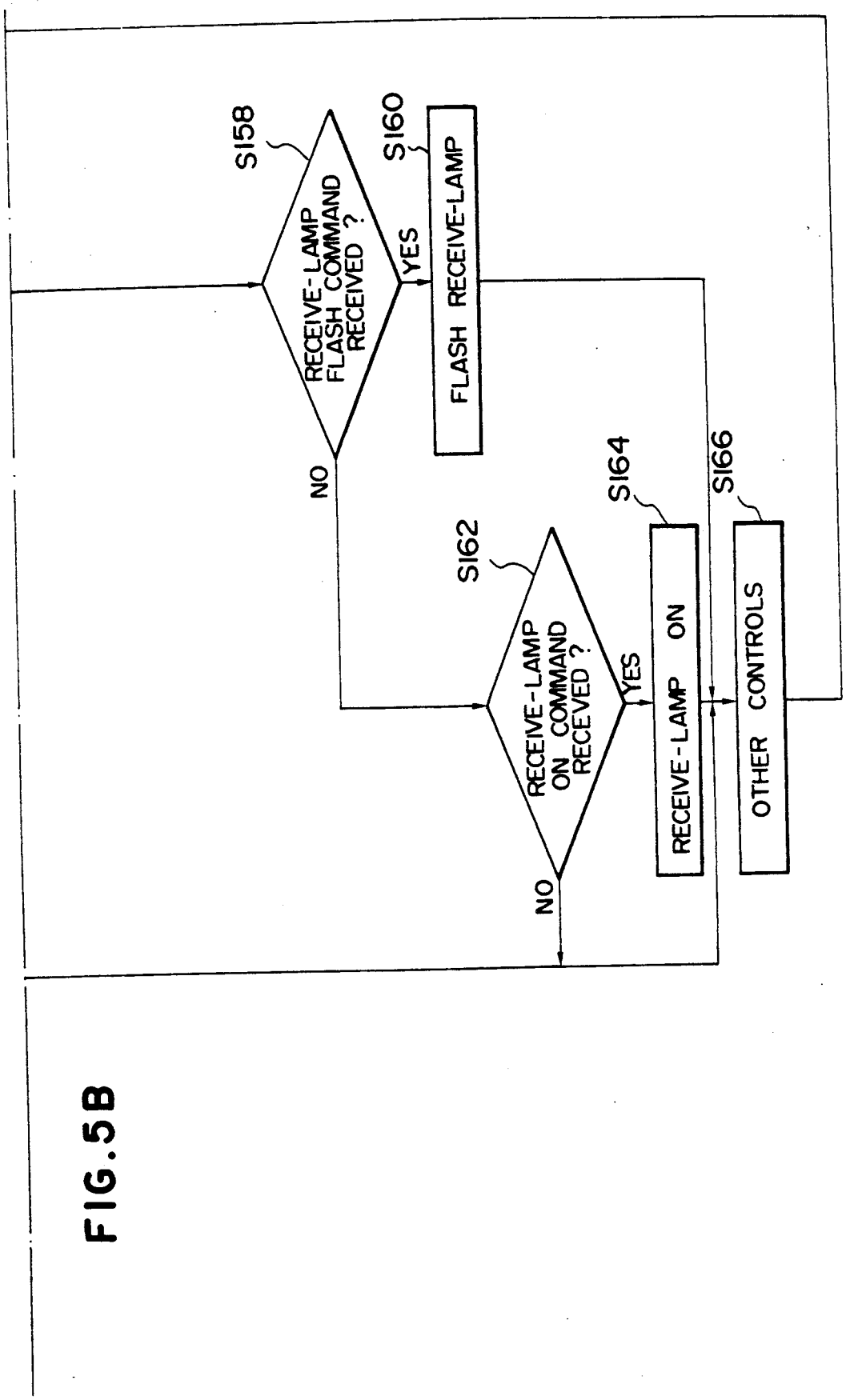

The operation of the apparatus having the above arrangement will be described with reference to FIGS. 4 and 5. FIGS. 4 and 5 are flow charts showing control sequences of the control units 54 and 94 shown in FIGS. 2 and 3, respectively. The control sequence in FIG. 4 is stored in the ROM 54r in the control unit 54. The control sequence in FIG. 5 is stored in a ROM 94r in the control unit 94. The control unit 94 comprises a microcomputer and its peripheral devices such as the ROM 94r, a RAM, and an I/O port in the same manner as in the control unit 54.

The control unit 54 controls the communication operation of the fax machine and also systematically controls the operations of the telephone sets 4, 6, and 8. In addition, the control unit 54 allows data exchange between the fax machine and the telephone set to combine the function of the telephone set with the function of the fax machine. The presence/absence of the sent original and the received image is controlled and displayed on the telephone set on the basis of detection operations of the detect circuits 29 and 47, as will be described below.

In the resetting operations in steps S102 and S104, the control unit 54 instructs to turn off the send- and receive-lamps 86 and 88 for the telephone sets 4, 6, and 8. Turn-off control is performed by sending a turn-off command from the data transfer control unit 52 through the signal line 52a. Processing in the telephone set upon reception of the turn-off command will be described below.

The control unit 54 determines in step S106 whether a sent original is stacked on the original exhaust table through the sent original detect circuit 29. If YES in step S106, the flow advances to step S110. However, if NO in step S106, a turn-off command for the send-lamp 86 is sent to the telephone sets in step S108 in the same manner as in step S102.

The control unit 54 determines in step S110 whether a sheet having the received image thereon is stacked on the recording sheet table or received image data is resent in the image memory. If the received image is determined to be present, the flow advances to step S114. Otherwise, the turn-off command for the receive-lamp 88 is sent to the telephone sets in step S112.

The control unit 54 determines in steps S114 and 124 whether the facsimile send or receive mode is selected, respectively. This determination is performed by checking the operating state of the operation panel in a fax machine (not shown). When neither the fax send nor receive mode are selected, the flow returns to step S106. When the fax send mode is selected, the flow advances to step S116. However, when the fax receive mode is selected, the flow advances to step S126.

In step S116, a turn-on command for the send-lamp 86 is sent to the telephone sets, and the send-lamp 86 is turned on.

Subsequently, in step S118, the respective components of the fax machine are controlled to perform sending by the fax machine. Information obtained during sending by the fax machine, such as a telephone number, a user abbreviated name, a communication mode, and other information, is sent to the telephone sets through the signal lines 52a as needed. The control unit 94 causes the display unit 82 to display the source telephone number, its abbreviated name, and its communication mode on the basis of these pieces of information. The control unit 94 receives a control instruction for interrupting or continuing the facsimile communication operation through the keyboard 84 in the telephone set and sends key input information to the control unit 54 through the signal line 52a. Therefore, the control unit 54 interrupts or continues the facsimile communication.

The control unit 54 determines in step S120 whether sending by fax is completed. If YES in step S120, the flow advances to step S122. In this step, a flash command is sent to the telephone set, and the send-lamp 86 flashes.

When the fax receive operation is designated, the control unit 54 sends a turn-on command for the receive-lamp 88 to the telephone sets in step S126, and the receive-lamp 88 is turned on.

In step S128, the fax receive operation is performed. During fax reception, information obtained by communication is sent to the telephone sets as needed and is displayed on the display unit 82 on the telephone set. In addition, the information is utilized to interrupt or continue communication through the keyboard 84 of the telephone set.

The control unit 54 determines in step S130 whether reception by fax is completed. If YES in step S130, the flow advances to step S132. In this step, a flash command is sent to the telephone set, and the receive-lamp 88 flashes.

The turn-on control commands for the send- and receive-lamps transferred by the control sequence in FIG. 5 are processed in the telephone sets 4, 6, and 8.

Steps S142, S146, and S150 in FIG. 5 are steps for detecting the turn-off, flash, and turn-on commands for the send-lamp 86. Steps S154, S158, and S152 are steps for detecting the turn-off, flash, and turn-on commands for the receive-lamp 88.

The command detection steps are connected in a direction of a negative decision. Only when one of the steps is determined to be affirmative are operation steps connected in a direction of an affirmative decision executed. In other words, the send- and receive-lamps are turned on, turned off, or flash in accordance with the detection steps.

The operation steps corresponding to the detection steps are steps S144, S148, S152, S156, S160, and S164. When the operation steps are not performed, control is shifted to the operation after the last operation step S164.

When the loop of the detection and operation steps S142 to S164 is completed, other control operations are performed in step S166. More specifically, outgoing call control, incoming call control, remote control of the fax machine, and transfer control of the key input information are performed using the keyboard 84.

As described above, line control functions of the telephone set and the fax machine, which are independently provided in the respective equipment, can be constituted by a common circuit, thereby reducing the cost of the apparatus. In addition, the functions of the telephone set and the fax machine which are independently effected are systematically coupled. For example, information can be transferred from the telephone set to the fax machine, and vice versa, and the transferred information is displayed. In addition, the fax machine can be controlled in accordance with the input data at the keyboard of the telephone set. Therefore, the operator need not go to the installation location of the fax machine to monitor or control the operation of the fax machine.

In this embodiment, the send-lamp of the telephone set is turned on during sending by fax. Upon completion of sending by fax and exhaustion of the original on the original table, the send-lamp of the telephone set flashes. Furthermore, during reception by fax, the receive-lamp of the telephone set is turned on. When reception by fax is completed and the received image is prepared in the memory or on the recording sheet, the receive-lamp flashes.

Under the above control, the operator can monitor a communication operation of the fax machine at a remote location from the desk of the operator while the operator sits at the desk. According to the above control, the operator can collect sent original or received image as soon as sending or receiving is completed. In addition, the operator can know through a telephone set whether the fax machine is used.

In the above embodiment, lamps are used to detect a communication state at the telephone sets. However, a liquid crystal display unit may be used to display the communication conditions.

In the above description, the fax machine as a non-speech terminal is connected together with the telephone sets, and the telephone sets are controlled by the line control unit in the fax machine. However, the non-speech terminal is not limited to the fax machine but can be replaced with another data communication device. For example, the above techniques can be similarly used when a personal computer is connected to the communication lines.

According to the first embodiment, as is apparent from the above description, the communication operation state of the data communication apparatus can be known through the telephone set, and efficiency of operations using the data communication apparatus can be greatly improved.

In a communication system having one fax machine connected to a plurality of telephone sets, information such as a telephone number, a user abbreviated name, and a communication mode of an opposite station is displayed on a display unit of the telephone set in a second embodiment to be described below.

Figure 7:
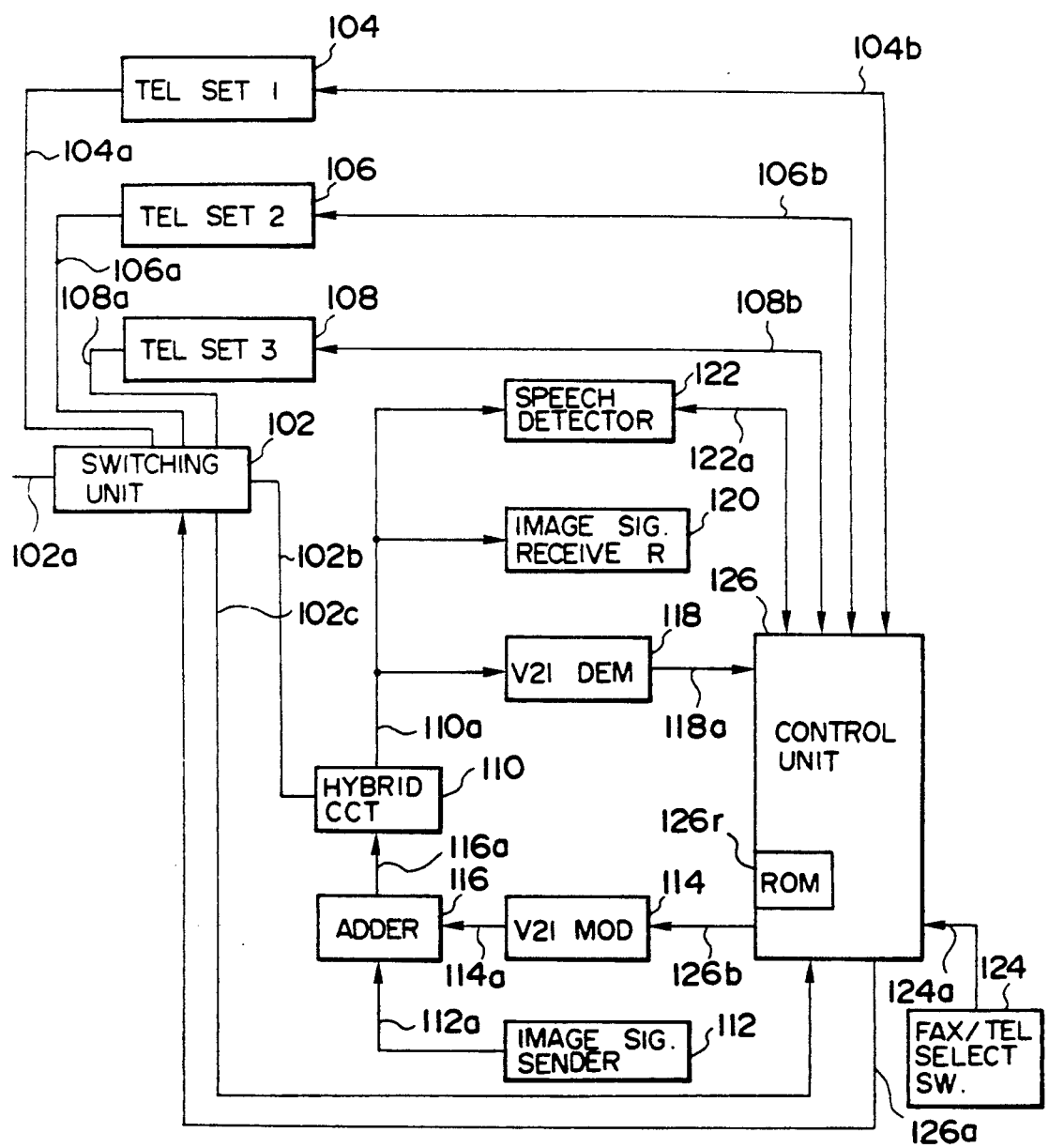
FIG. 7 is a block diagram of a communication apparatus according to a second embodiment of the present invention.

FIG. 7 is a block diagram of a communication system according to the second embodiment. The main unit for performing line control is constituted by utilizing a control system in the fax machine.

As shown in FIG. 7, a telephone line 102a is connected to a line switching unit 102. Telephone sets 104, 106, and 108 as speech terminals are connected to the line switching unit 102 through corresponding signal lines 104a, 106a, and 108a. A fax communication system including a hybrid circuit 110 and subsequent circuits is connected as a nonspeech terminal through a signal line 102b.

A control unit 126 controls the switching operation of the line switching unit 102 through a signal line 126a. The control unit 126 selectively sends data "0" to data "3" to the line switching unit 102 to connect the line 102a to the hybrid circuit 110 or the telephone sets 104, 106, and 108 on the basis of the data values. A connection priority for the control of a FAX/TEL select switch 124. The FAX/TEL select switch 124 is manually operated to send data "0" (facsimile) or "1" (telephone) to the control unit 126 through a signal line 124a to designate equipment to be connected to the line 102a.

The facsimile system including the hybrid circuit and elements connected thereto is arranged as follows.

The hybrid circuit 110 connected to the line switching unit 102 through the signal line 102b is used to separate the sending signal from the reception signal. The sending signal is input to a signal line 116a, and a reception signal is output through a signal line 110a. A sender system comprises an adder 116, a modulator 114, and an image signal sender 112.

The adder 116 adds procedure or image signals input from the modulator 114 and the image signal sender 112 through corresponding signal lines 114a and 112a. The image signal sender 112 includes known circuits such as an image reader of a CCD sensor or the like, and a redundancy suppression circuit.

The modulator 114 modulates the sending procedure signal input from the control unit 126 through a signal line 126b having a modulation scheme complying with the CCITT Recommendation V21.

A demodulator 118 connected to the signal line 110a demodulates the received procedure signal according to a demodulation scheme complying with the CCITT Recommendation V21. The demodulated procedure signal is input to the control unit through a signal line 118a.

The received image signal is demodulated and decoded by an image signal receiver 120 and is recorded by a recorder comprising a thermal printer or the like.

In the second embodiment, when the speech signal in the received signal is detected, speech communication is performed through a speech detector 122 connected to the signal line 110a. When the speech signal is detected, a detection signal is output to the control unit 126 through a signal line 122a.

The facsimile system comprises a display unit (not shown) such as a liquid crystal display unit for displaying information associated with a communication state and information obtained by communication in the same manner as in the conventional system. In this embodiment, information can also be output to display units arranged in the telephone sets 104, 106, and 108. Information to be displayed on the telephone sets 104, 106, and 108 is output from the control unit 126 through signal lines 104b, 106b, and 108b. The signal lines 104b, 106b, and 108b are signal lines for sending information to be displayed on the telephone sets and power source lines.

Various types of information obtained during communication by fax and to be displayed on the telephone sets 104, 106, and 108 are plausible. In order to simplify a description of this embodiment, a telephone number and a user abbreviated name (these two pieces of information are referred to as facsimile information hereinafter) of the opposite station during communication by fax are displayed on the display unit of the telephone set 104, 106, or 108.

Figure 8:
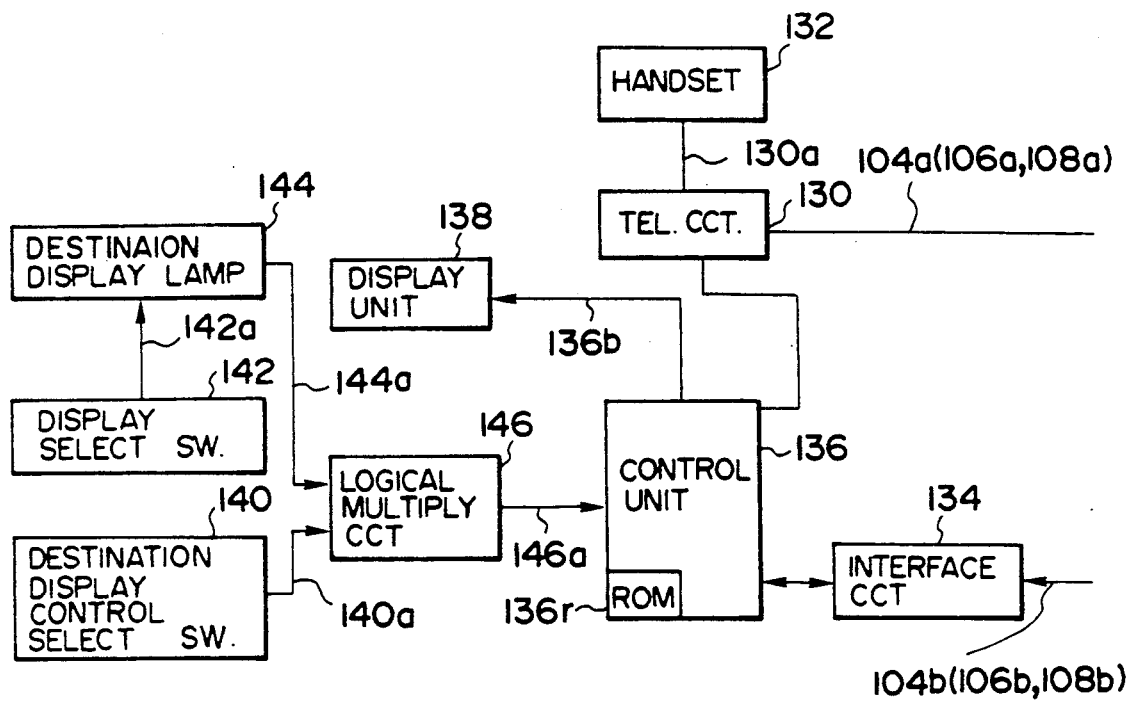
FIG. 8 is a block diagram of a telephone set shown in FIG. 7.

FIG. 8 shows the internal structure of the telephone set 104 (the internal structures of the telephone sets 106 and 108 are the same as that of the telephone set 104) shown in FIG. 7. The signal line 104a connected to the line switching unit 102 is connected to a telephone circuit 130 including an antiside tone circuit and a speech network. Communication is performed through a handset 132 connected to the telephone circuit 130 through a signal line 130a.

All operations of the telephone set 104, i.e., station line outgoing calling, abbreviated dialing, on-hook dialing, hand-free communication, extension calling, and call transfer as well as other additional functions are controlled by the control unit 126 in the fax machine through the signal line 104b.

Display/output control of information obtained during communication by fax and transferred from the control unit 126 shown in FIG. 7 is performed by a control unit 136 comprising a microcomputer and its peripheral circuits such as a ROM 136r and a RAM. Information transferred from the control unit 126 (FIG. 7) through the signal line 104b is input to the control unit 136 through an interface circuit 134.

The interface circuit 134 includes serial or parallel elements (e.g., a PPI). The information received through the signal line 104b is displayed and outputted on a display unit 138 comprising a liquid crystal display unit.

In the second embodiment, a destination display control select switch 140 and a display select switch 42 are arranged in order to control display/output of the information sent from the fax machine. The switch 140 enables or inhibit display/output of the information sent from the fax machine. In the display enable state, the switch 140 outputs a signal of logic "1" onto a signal line 140a. However, in the display inhibition state, the switch 140 outputs a signal of logic "0" onto the signal line 140a.

The switch 142 comprises a button switch. Upon repetitive operation, the switch 142 repeats toggle operation. An operation of the switch 142 is monitored by a destination display lamp 144 comprising an LED or the like. When the switch 142 is set in the select state, a pulse appears on a signal line 142a, so that the lamp 144 is turned on. At the same time, the pulse is output to a signal line 144a.

The signal lines 140a and 144a are connected to a logical multiply circuit (or AND gate) 146 comprising TTL elements or the like. The logical multiply circuit 146 generates an AND signal of the input signals and the AND signal is supplied to the control unit 136 through a signal line 146a. The signal on the signal line 146a is set at logic "1" for enabling display/output and logic "0" for inhibiting display/output.

Control by the switches 140 and 142 is performed as follows. When the switch 140 is set in the inhibit state, output of facsimile information to the display unit 138 is unconditionally inhibited. However, when the switch 140 is set in the output enable state, enabling and inhibition of display/output of the information are alternately switched upon operations of the switch 142.

Figure 10:
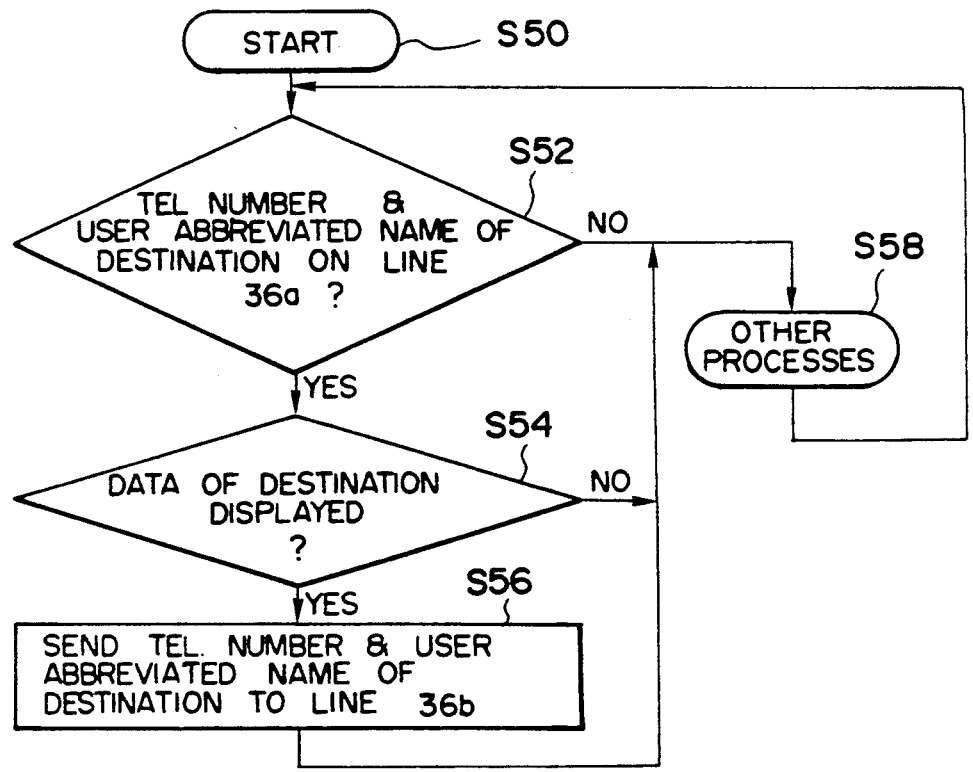
FIG. 10 is a flow chart for explaining a control sequence of a control unit in a telephone set.
Figure 9:
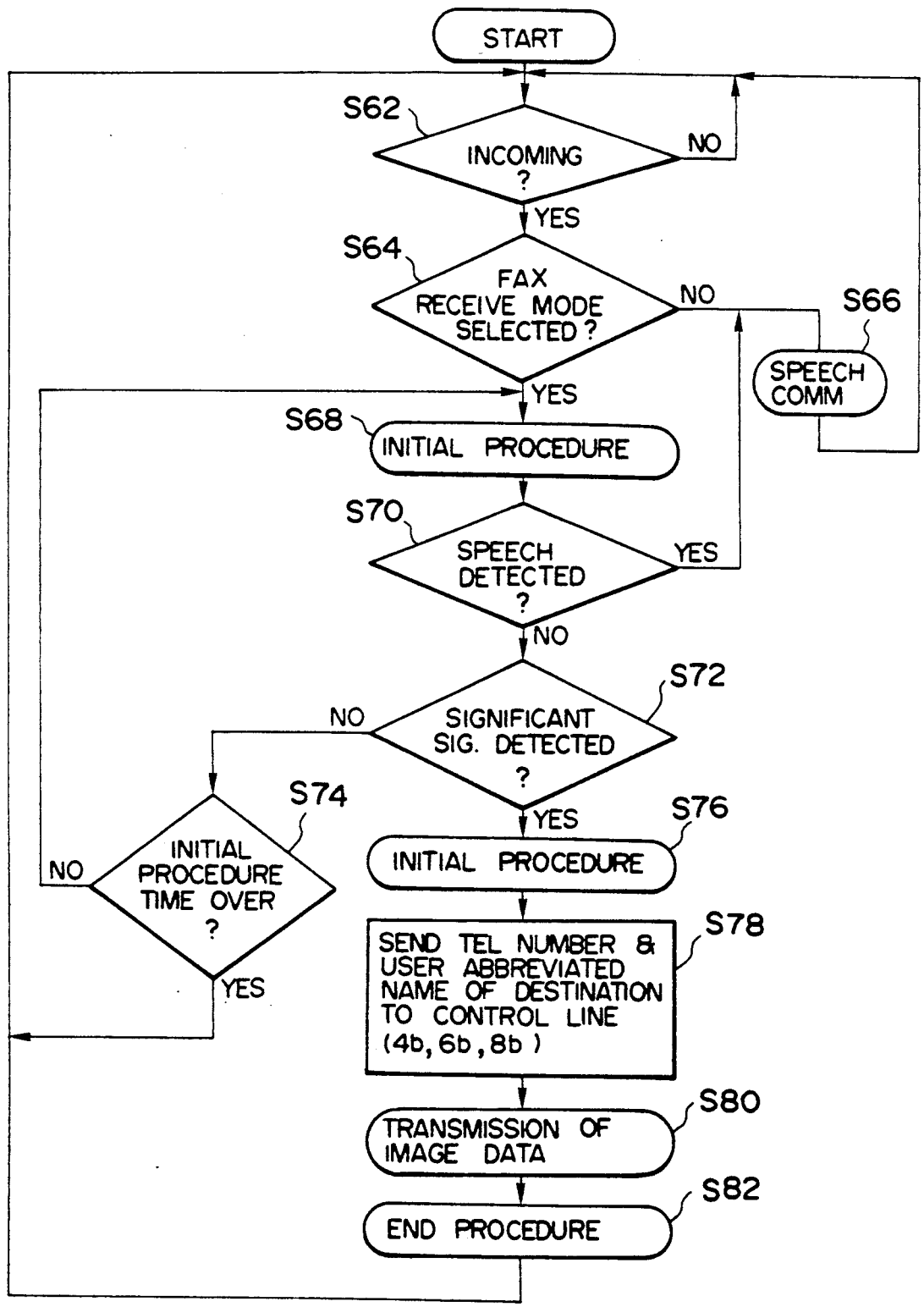
FIG. 9 is a flow chart for explaining a control sequence of a control unit of the second embodiment.

The operation of the communication system having the above arrangement will be described in detail with reference to flow charts in FIGS. 9 and 10. FIG. 9 shows a control program of the ROM 126r to control the control unit 126, and FIG. 10 shows a control program of the ROM 136r to control the control unit 136.

Incoming processing under the control of the control unit 126 will be described with reference to FIG. 9.

The control unit 126 checks in step S62 of FIG. 9 the state of a signal line 102c and determines whether the line switching unit 102 detects an incoming call. If YES in step S62, i.e., if reception of a predetermined signal is detected, the flow advances to step S64. The control unit 126 determines a selection state of the switch 124 through the signal line 124a. If the fax receive mode is set, the flow advances to step S68. Otherwise, the flow advances to step S66.

In step S66, the telephone line 102a is connected to the telephone sets 104, 106, and 108 by the line switching unit 102, thereby performing speech communication.

In step S70, the control unit 126 checks an output state of the speech detector 122 through the signal line 122a and determines whether speech is detected. If the other end is a speech terminal, the flow advances to step S66.

The control unit 126 determines in step S72 whether a significant signal such as a fax procedure signal is detected. This decision block is processed through the demodulator 118. The operations in steps S68 to S72 are repeated within a predetermined waiting time in the decision block of step S74. When the control unit 126 determines that the predetermined period of time has elapsed, control is returned to step S62. Time counting processing in step S74 is controlled by a timer (not shown) constituted by a software or hardware timer.

The operations in steps S76 to S82 represent known facsimile communication. Step S76 represents an initial procedure. In this step, the procedure signal obtained by using the modulator 114 and the demodulator 118 is exchanged. In the initial procedure, the control unit 126 can detect the telephone number and the user abbreviated name of the destination in accordance with the received identification signal. The facsimile information consisting of the telephone number and the user abbreviated name is transferred to the telephone sets 104, 106, and 108 through the signal lines 104b, 106b, and 108b in step S78.

In step S80, the image signal is sent or received by the sender 112 or the receiver 120. When image transfer is completed, an end procedure is performed in step S82, and the facsimile communication is ended. The flow then returns to step S62.

Information transferred to the telephone sets 104, 106, and 108 in step S78 is displayed on the display units 138 of the telephone sets 104, 106, and 108 according to the sequence in FIG. 10.

The control unit 136 in step S52 of FIG. 10 determines that the data received through the signal line 104b (106b or 108b) include the telephone number and the user abbreviated name. If NO in step S52, other processes are performed in step S58.

However, if YES in step S52, the output state of the logical multiply circuit 146 is determined through the signal line 146a in step S54. If the signal line 146a is set at logic "1", the display/output of the facsimile information is designated by the operator. The information received in step S56 is output to the signal line 136b and is displayed on the display unit 138. However, if NO in step S54, the flow advances to step S58, and other processes are performed.

The communication system according to this embodiment receives an incoming call, as described above. However, the same processing as described above can be performed when the communication system sends information.

With the above arrangement, when the fax machine is installed at a corner of a room, and the telephone sets are installed on the respective desks of a plurality of operators, the telephone number and the user abbreviated name of the opposite station can be confirmed upon operations of the switches 140 and 142 of the telephone set even if the operator does not go to the location of the fax machine. For example, if an image is to be sent, the operator sets an original on the reader of the fax machine and depresses a start switch. The operator then returns to his own desk and operates the switch 142 so to check if the desired destination is properly called while doing another job at his desk.

With the above arrangement, display of the facsimile information on the telephone set can be perfectly inhibited by the switch 140, so that other display contents on the display unit 138 cannot be interfered by an operation error with the switch 142. Furthermore, the facsimile information can be displayed by the switch 142, as needed.

In the above embodiment, the telephone number and the user abbreviated name of the destination can be displayed on the telephone set. However, the information to be displayed on the telephone set is not limited to those. Any information obtained during facsimile communication can be displayed. For example, if the number of pages of the originals is known prior to facsimile communication, the number of remaining pages or a required time interval for the remaining pages can be displayed on the telephone set. In addition, the operating state of the fax machine (e.g., the fact as to whether the facsimile is operated or not) can be known by the telephone set.

In a communication system having one fax machine connected to a plurality of telephones, the receive mode is displayed on the telephone set on the basis of a destination in the fax receive mode according to a third embodiment to be described below.

Figure 11A:
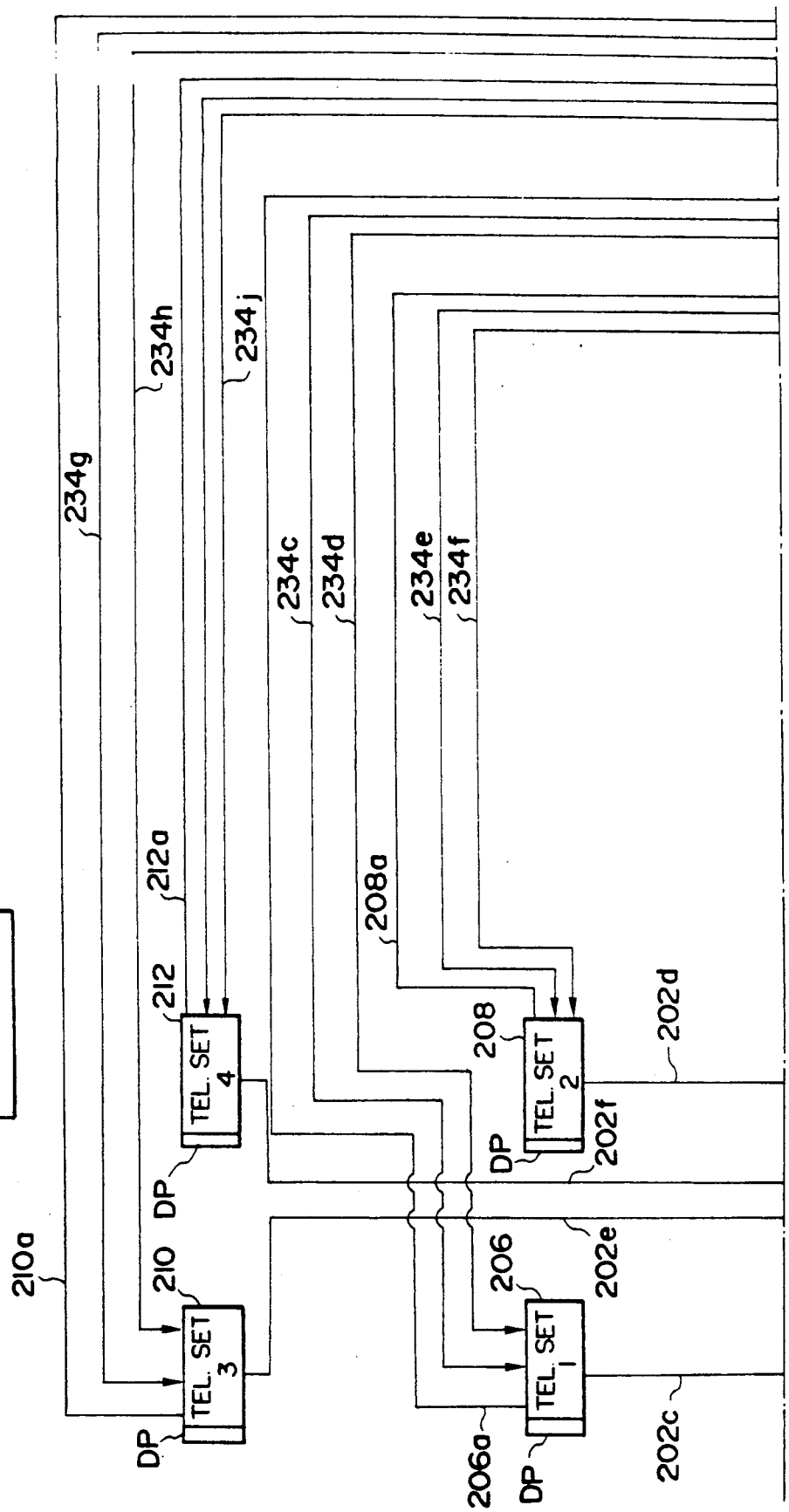
FIGS. 11A and 11B are block diagrams of parts of a communication system according to a third embodiment of the present invention.
Figure 11B:
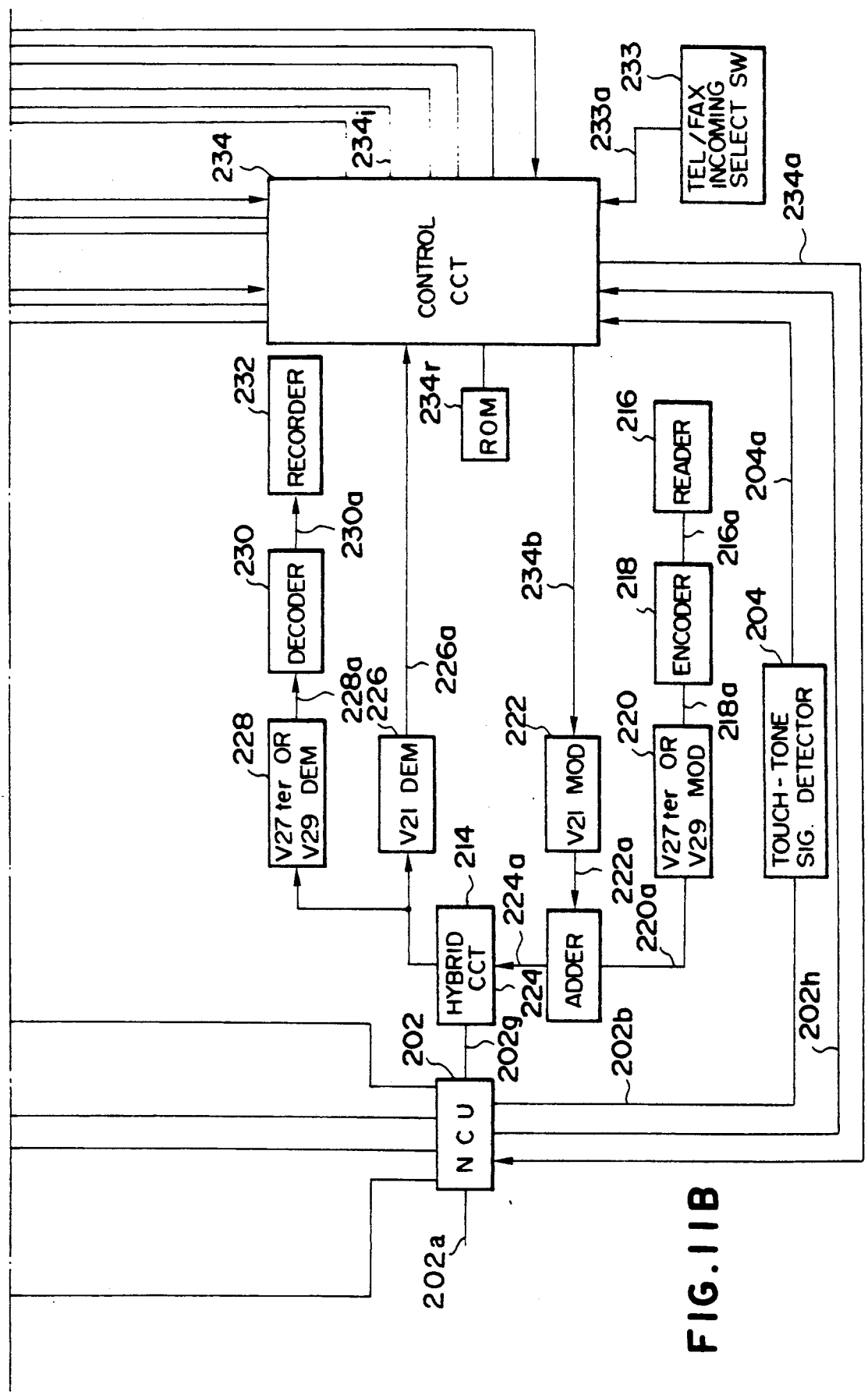

FIG. 11 shows a communication system employing the present invention according to the third embodiment. The system comprises a network in which a fax machine and four telephone sets 206, 208, 210, and 212 are connected to a telephone line 202a.

As shown in FIG. 11, the telephone line 210a is connected to an NCU 202. The telephone sets 206, 208, 210, and 212 as speech terminals are connected to the NCU 220 through corresponding signal lines 202c, 202d, 202e, and 202f. A facsimile communication system as a nonspeech terminal including a hybrid circuit and the elements connected thereto is connected to the NCU 202 through a signal line 202g.

A control circuit 234 controls switching of the NCU 202 through a signal line 234a. More specifically, the control circuit 234 selectively sends data "0". to "5" to the NCU 202 to connect the signal line 202a to the hybrid circuit 214 or the telephone set 206, 208, 210, or 212 through signal lines 202c to 202g, or to a signal line 202b.

A Touch-Tone signal detector 204 is connected to the signal line 202b to detect a dial signal of the telephone set. A detection result is input to the control circuit 234 through a signal line 204a.

A connection priority for the telephone sets and the fax machine is determined by control of a TEL/FAX incoming select switch 233. The select switch 233 is manually operated to output logic "0" (facsimile) or "1" (telephone) to the control circuit 234 through a signal line 224a to designate equipment to be connected to the office line.

The facsimile system including the hybrid circuit and elements connected thereto is arranged as follows.

The hybrid circuit 214 connected to the NCU 202 through the signal line 202g is used to separate the sending signal from the reception signal. The sending signal is input from the signal line 224a, and the reception signal is output through a signal line 214a. A sending system comprises an adder 224, modulators 220 and 222, an encoder 218, and a reader 216.

The adder 224 adds the image or facsimile procedure signals input from the modulators 220 and 222 through signal lines 220a and 222a.

The procedure signal is input to the modulator 222 through a signal line 234b. The modulator 222 modulates the sent procedure signal input from the control circuit 234 in accordance with a modulation scheme complying with the CCITT Recommendation V21.

The image signal is read by the reader 216 comprising a CCD line sensor and the like and is compressed by the encoder 218 according to the MH or MR coding scheme. Thereafter, the encoded signal is modulated by the modulator 220 complying with the CCITT Recommendation V27 ter. or V29. The modulated image signal is input to the adder 224.

A demodulator 226 connected to the signal line 214a demodulates the input procedure signal in accordance with a modulation scheme complying with the CCITT Recommendation V21. The demodulated procedure signal is input to the control circuit 234 through a signal line 226a.

The image signal is demodulated by a demodulator 228 having a demodulation scheme corresponding to the modulation scheme of the modulator 220. The demodulated image signal is input to a decoder 230 through a signal line 228a. The decoder 230 has a decoding scheme corresponding to the encoding scheme of the encoder 218 and decodes the compressed data into original binary data. The converted data is input to a recorder 232 comprising a thermal printer or the like and is recorded thereby.

The control circuit 234 includes a micro-processor and controls the respective components of the communication system on the basis of programs (to be described later) stored in a ROM 234r. The four telephone sets 206, 208, 210, and 212 are connected to the control circuit 234 through three-wire signal lines.

The signal lines 206a, 208a, 210a, and 212a of these signal lines are used to acknowledge the on-/off-hook state of the telephone sets to the control circuit 234. These signal lines are set at logic "0" for the on-hook state and "1" for the off-hook state.

The other two signal lines connected to each telephone set are used to send a control signal for a display unit DP arranged in each telephone set and a control signal for a ringing tone generator therein. These control signal lines are represented by reference numerals 234c and 234d, 234d and 234e, . . . , 234i and 234j. The signal lines having letters appearing first in the alphabetical order are used for ringing tone control, and the remaining lines are used for display control.

For example, as for the telephone set 206, if the signal line 234c is set at logic "1", the bell of the telephone set 206 rings. However, if the signal line 234c is set at logic "0", the bell is not driven. When the signal line 234d is set at logic "1", the display unit DP performs display. However, if the signal line 234d is set at logic "0", the display unit DP is disabled. This arrangement is common in all telephone sets.

The display unit DP comprises a lamp circuit of an LED or LCD. When the display unit DP is driven through the above signal line, it displays a message "FAX ON". When the display unit DP is deenergized, such display is inhibited.

In this embodiment, when the facsimile system including the hybrid circuit and the elements connected thereto receives an image, a destination (i.e., the telephone set 206, 208, 210, or 212) of the receiving image is discriminated, and the telephone as the destination station rings, thus signalling to the operator that the image is sent to him by fax.

Figure 12B:
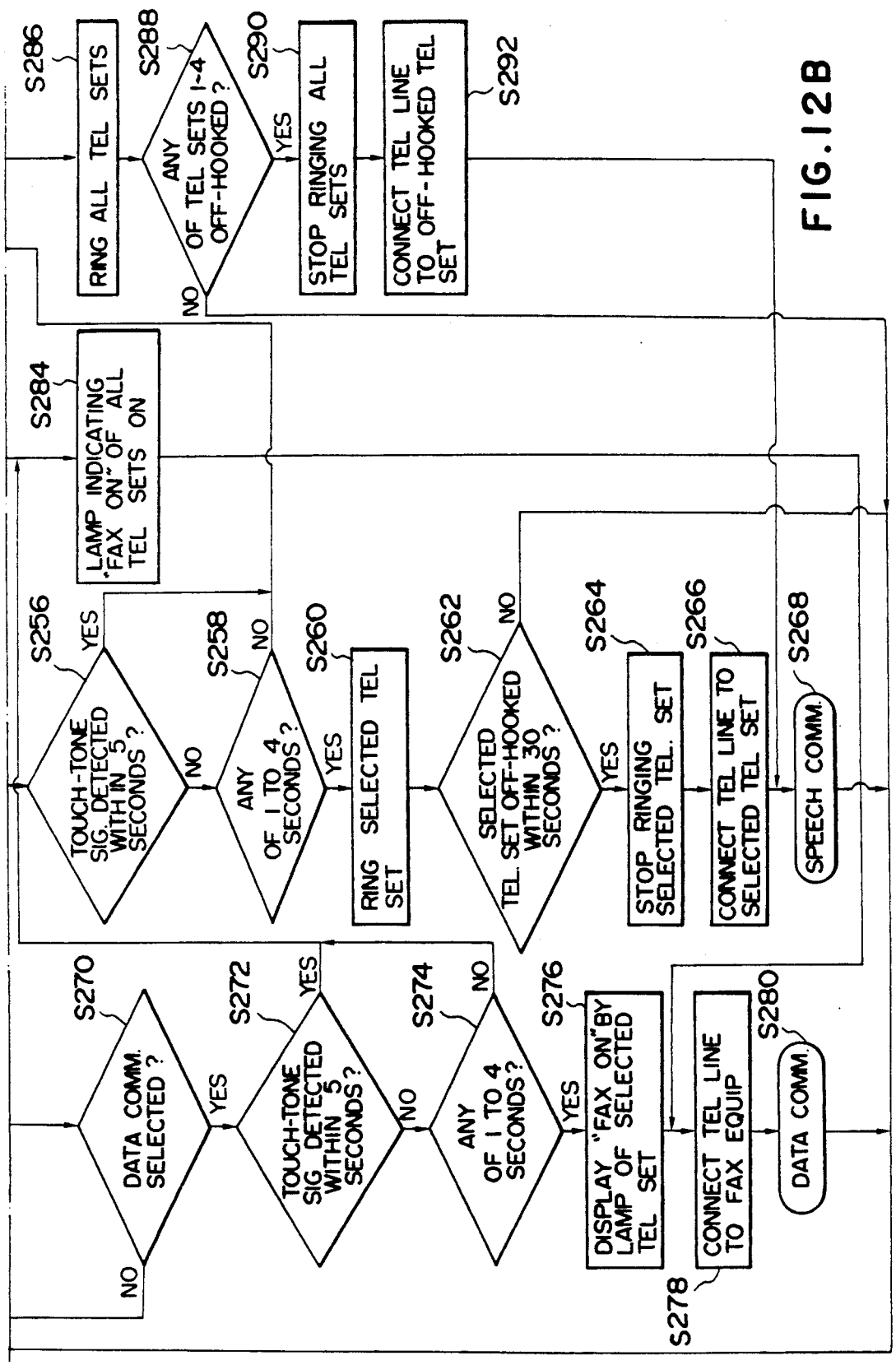

The control sequence of the control circuit 234 for performing the above operation will be described in detail. FIG. 12 is a flow chart for explaining communication control of the control circuit 234 shown in FIG. 11. The control sequence shown in FIG. 12 is stored as a control program for the control circuit 234 in the ROM 234r.

In step S242 of FIG. 12, the control circuit 234 outputs a signal of logic "1," onto the signal line 234a to connect the telephone line to the telephone set 206.

In step S244, the control circuit 234 outputs signals of level "$\phi$" onto the signal lines 234c, 234e, 234g, and 234i to inhibit ringing of all the telephone sets (telephone sets 1 to 4) 206, 208, 210, and 212.

In step S246, the control circuit 234 outputs signals of level "$\phi$" onto the signal lines 234d, 234f, 234h, and 234j to turn off the lamps of "FAX ON" of all the telephones (telephone sets 1 to 4).

The control circuit 234 determines in step S248 whether an incoming detection pulse appears on a signal line 202h, i.e., an incoming call is detected. If the incoming detection pulse is detected on the signal line 202h, i.e., an incoming call is detected, the flow advances to step S250.

In step S250, the control circuit 234 outputs a signal of level "$\phi$" onto the signal line 234a to connect the telephone line to the signal line 202b.

The control circuit 234 receives the signal appearing on the signal line 204a and determines in step S252 whether a Touch-Tone signal is detected within 5 seconds. When the Touch-Tone signal is detected within 5 seconds, the flow advances to step S254. However, when the Touch-Tone signal is not detected within 5 seconds, the flow advances to step S282.

The control circuit 234 determines in step S254 whether the * key is depressed, i.e., speech communication is selected. If YES in step S254, the flow advances to step S256. However, if NO in step S254, the flow advances to step S270.

The control circuit 234 receives the signal appearing on the signal line 204a and determines in step S256 whether a Touch-Tone signal is detected within 5 seconds. If the Touch-Tone signal is detected within 5 seconds, the flow advances to step S258. Otherwise, the flow advances to step S286.

The control circuit 234 determines in step S258 whether the information detected in step S256 represents any of 1 to 4 seconds. If YES in step S258, the flow advances to step S260. However, if the information is determined not to represent any of 1 to 4 seconds, i.e. if significant information is not detected, the flow advances to step S286.

In step S260, the selected telephone set rings. More specifically, if "1" is detected in step S256, then a signal of logic "1" is sent onto the signal line 234c; if "2," then 234e; if "3", then 234g; and if "4", then 234i.

The control circuit 234 then determines in step S262 whether the selected telephone set is off-hooked within 30 seconds. If the selected telephone set is telephone set 1 (206), then the control circuit 234 fetches the signal appearing on the signal line 206a and discriminates it. However, if the selected telephone set is telephone set 2 (208), then the control circuit 234 fetches the signal appearing on the signal line 208a and discriminates it; if 3 (210), then 210a; and if 4 (212), then 212a. When the selected telephone set is determined to be off-hooked within 30 seconds, the flow advances to step S264. Otherwise, the flow advances to step S242.

In step S264, the selected telephone set stops ringing. More specifically, if the selected telephone set is telephone set 1, then a signal of level "$\phi$" is output onto the signal line 234c; if 2, then 234e; if 3, then 234g; and if 4, then 234i.

In step S266, the telephone line is connected to the selected telephone set. More specifically, if the telephone set assigned to the signal line 234a is 1, then the control circuit 234 outputs "1", if 2, then "2"; if 3, then "3", and if 4, then "4".

Speech communication is performed in step S268.

The control circuit 234 determines in step S270 whether the # key is detected, i.e., if data communication is selected. If the "#" key is detected, i.e., if the data communication is selected, the flow advances to step S272. However, if the "#" key is not detected, i.e., if the data communication is not selected, the flow advances to step S282.

The control circuit 234 fetches the signal appearing on the signal line 204a and determines in step S272 whether the Touch-Tone signal is detected within 5 seconds. If the Touch-Tone signal is detected within 5 seconds, the flow advances to step S274. Otherwise, the flow advances to step S284.

In step S276, the control circuit 234 instructs to turn on the lamp indicating "FAX ON" of the selected telephone set. In step S272, when "1" is detected, a signal of logic "1" is sent onto the signal line 234d; if "2", then 234f; if "3", then 234h; and if "4", then 234j.

In step S278, the telephone line is connected to the fax machine or equipment. A signal of "5" is output onto the signal line 234a.

Data communication is performed in step S280.

The control circuit 234 determines in step S282 whether the fax receive mode is selected, i.e., whether a signal line 233a is set at logic "1". If the fax receive mode is determined to be selected, i.e., the signal level "1" is determined to appear on the signal line 233a, the flow advances to step S284. If the telephone set is allowed to ring, i.e., if the signal level of the signal line 233a is set to be "$\phi$", the flow advances to step S286.

In step S286, all telephone sets ring. In other words, the control circuit 234 outputs a signal of logic "1" onto the signal lines 234c, 234e, 234g, and 234i.

The control circuit 234 determines in step S288 whether one of telephone sets 1 to 4 is off-hooked within 30 seconds. This determination is performed by fetching the signals appearing on the signal lines 206a, 208a, 210a, and 212a. When any of telephone sets 1 to 4 is off-hooked within 30 seconds, the flow advances to step S290. Otherwise, the flow advances to step S242.

In step S290, the control circuit 234 outputs a signal of level "$\phi$" onto the signal lines 234c, 234e, 234g, and 234i to stop ringing all the telephone sets.

In step S292, the telephone line is connected to the off-hooked telephone set. More specifically, if the off-hooked telephone set is telephone set 1, a signal of "1" is output; if 2, then a signal of "2"; if 3, then a signal of "3"; and if 4, then a signal of "4". In this manner, one of the telephone sets is connected to the telephone line.

When the fax receive mode is set according to the above control sequence, the destination telephone set rings by dialing the number (1, 2, 3, or 4) of the telephone set, thereby informing the operator that the fax receive mode for his telephone set is selected. When the destination operator answers the phone, display indicating "FAX ON" is performed on only his telephone set, and facsimile reception is performed.

If the telephone set is not selected by the source end, or the operator at the selected telephone does not respond, the lamps indicating "FAX ON" of all telephone sets are turned on, and the conventional fax receive mode is set.

In the system having a plurality of telephone sets and a fax machine, the destination in the fax receive mode can be specified by the above control operations. Unlike in the conventional system, an operator who is not associated with communication need not receive the information or hand it to the person at the destination. Jobs using the facsimile system can be smoothly performed.

In the above embodiment, the information associated with the destination of facsimile communication is output by ringing a bell circuit of the telephone set or visually displaying information "FAX ON". However, information may be output by another means, e.g., a speech signal by using a speech synthesizing means.

In the above embodiment, when the sending end does not select the destination, all telephone sets ring. However, the operation is not limited to this. For example, when the TEL/FAX select switch 233 is set in the TEL position, a predetermined telephone set may ring.

In the above embodiment, the fax machine or equipment is exemplified as a communication apparatus. However, the communication apparatus is not limited thereto. Various communication apparatuses such as a data terminal may be combined with the telephone sets.

According to the third embodiment described above, the destination of the information received by the communication apparatus can be specified, and the specified operator can know it. Therefore, operators who are not associated with facsimile communication need not be engaged with cumbersome communication operations. At the same time, information can be accurately sent to the destination.

The present invention is not limited to the particular embodiments described above. Other various changes and modifications may be made within the spirit and scope of the invention.

We claim:

1. A telephone system comprising:

a plurality of telephone sets each including display means; and a line switch apparatus, wherein said line switch apparatus further comprises:

a switch unit for selectively connecting a data communication unit or one of said plurality of telephone sets to an external line; and a transmission unit for transmitting data representing a state of the data communication unit to said plurality of telephone sets, and wherein said plurality of telephone sets simultaneously display the state of the data communication unit, on the basis of data transmitted by said transmission unit.

2. A system according to claim 1, wherein said transmission unit transmits the data representing that said data communication unit is in data communication, and said plurality of telephone sets simultaneously display that said data communication unit is in data transmission.

3. A system according to claim 1, wherein said transmission unit transmits the different data respectively when said data communication unit starts data transmission and when said data communication means starts data reception, and said plural telephone sets perform different displaying respectively when said data communication unit starts data communication and when said data communication means starts the data reception.

4. A system according to claim 1, wherein said transmission unit transmits the data according to presence/absence of a recording paper in said data communication unit, and said plurality of telephone sets perform displaying according to the presence/absence of the recording paper in said data communication unit.

5. A system according to claim 1, wherein said switch unit connects to the external line said data communication unit have a facsimile communication function.

6. A system according to claim 1, wherein said switch unit connects said plurality of telephone sets to the external line through a speech communication, and said transmission unit transmits the data to said plurality of telephone sets through a control channel which is different from said speech communication channel.

7. A system according to claim 1, wherein said transmission unit transmits the data to all of said plurality of telephone sets.

8. A line control apparatus comprising:

connection means for selectively connecting either of data communication means and a plurality of telephone sets to an external line; and transmission means for transmitting in parallel display data corresponding to a state of said data communication means to said plurality of telephone sets such that the state of said data communication means is displayed by each of said plurality of telephone sets.

9. An apparatus according to claim 8, wherein said transmission means transmits the display data in parallel to said plurality of telephone sets such that each of said plurality of telephone sets displays that said data communication means is in data communication.

10. An apparatus according to claim 8, wherein said transmission means transmits the different display data respectively in the state where said data communication means is in data transmission and in the state where said data communication means is in data reception, such that said plurality of telephone sets perform different displaying respectively in the state where said data communication means is in data transmission and in the state where said data communication means is in data reception.

11. An apparatus according to claim 8, wherein said transmission means transmits the display data in parallel to said plurality of telephone sets such that displaying according to presence/absence of a recording paper in said data communication means is performed by said plurality of telephone sets.

12. An apparatus according to claim 8, wherein said connection means connects to the external line said data communication means having a facsimile communication function.

13. An apparatus according to claim 8, wherein said connection means connects said plurality of telephone sets to the external line through a speech communication channel, and said transmission means transmits the display data to said plurality of telephone sets through a control channel which is different from said speech communication channel.

14. An apparatus according to claim 8, wherein said transmission means transmits the display data to all of said plurality of telephone sets.

15. A communication system comprising:

a plurality of telephone sets for respectively performing speech communication;

connection control means for performing line connection control for data communication means and said plurality of telephone sets; and output means for outputting to said plurality of telephone sets information relating to a data communication of said data communication means, wherein each of said plurality of telephone sets further comprises speech communication means and display means for presenting a display in response to the information output from said output means, and said plurality of telephone sets to which the information from said output means is input simultaneously perform the display according to the data communication of said data communication means.

16. A system according to claim 15, wherein said data communication means performs facsimile communication.

17. A system according to claim 15, wherein said output means outputs in parallel to said plurality of telephone sets the information relating to the data communication.

18. A system according to claim 15, wherein each of said display means displays whether said data communication means is performing data communication.

19. A system according to claim 15, wherein each of said display means displays a communication mode of said data communication means.

20. A system according to claim 15, wherein all of said plurality of telephone sets simultaneously perform the display according to the data information of said data communication means.

21. A system according to claim 15, wherein each of said display means displays information relating to a data communication partner of said data communication means.

22. A system according to claim 21, wherein each of said display means displays a telephone number or name of said communication partner.

23. A telephone exchange apparatus comprising:

switch means for connecting to a line either of a data communication means and one of a plurality of telephone sets;

discriminating means for discriminating whether a request from a communication partner is a data communication or not;

call means for calling the plurality of telephone sets simultaneously, in a case where said discriminating means discriminates that the request is not a data communication request; and control means for controlling said switch means such that said switch means connects to the line the one of the plurality of telephone sets which responds to a call from said call means.

24. An apparatus according to claim 23, wherein said control means controls said switch means such that, in a case where said discriminating means discriminates that the request is the data communication request, said switch means connects said data communication means to the line.

25. An apparatus according to claim 24, wherein, in a case where said discriminating means discriminates, subsequent to the data communication request, a selection request for selecting one of said plurality of telephone sets, said control means controls said selected telephone sets such that said selected telephone sets displays an indication that said set is reselected set.

26. A system according to claim 23, wherein said data communication means performs facsimile communication.

27. An apparatus according to claim 23, wherein said discriminating means discriminates that the request is not the data communication request, on the basis of a received push button signal.

28. A telephone system comprising:
a plurality of telephone sets;
connection control means for selecting one apparatus of a group including a data communication means and said plurality of telephone sets to connect a telephone line to the selected apparatus; and
output means for outputting, to said plurality of telephone sets in parallel through control lines, information relating to data communication which is performed by the data communications means,
wherein each of said plurality of telephone sets further comprises:
speech communication means for performing speech communication through a respective speech communication line, and
display means for presenting a display in response to the information output from said output means through a respective control line.

29. A system according to claim 28, wherein all of said plurality of telephone sets simultaneously perform the display according to the data information of said data communication means.

30. A system according to claim 28, wherein each of said display means displays whether said data communication means is performing data communication.

31. A system according to claim 28, wherein each of said display means displays a communication mode of said data communication means.

32. A system according to claim 28, wherein said plurality of telephone sets to which the information from said output means is input in parallel perform simultaneously the display in response to that information.

33. A system according to claim 28, wherein each of said display means displays information relating to a data communication partner of said data communication means.

34. A system according to claim 33, wherein each of said display means displays a telephone number or name of said data communication partner.

35. A system according to claim 28, wherein said data communication means performs facsimile communication.

36. A telephone system comprising:
a plurality of telephone sets;
line switch means for connecting to a line either of data communication means and said plurality of telephone sets; and
transmission means for transmitting to said plurality of telephone sets a control signal representing whether or not said data communication means is in data communication,
wherein said plurality of telephone sets simultaneously display whether or not said data communication means is in data communication, according to the control signal.

37. A system according to claim 36, wherein all of said plurality of telephone sets simultaneously display whether or not said data communication means is in data communication.

38. A system according to claim 36, wherein said data communication means performs facsimile communication.

39. A system according to claim 36, wherein said transmission means transmits in parallel the control signal to said plurality of telephone sets.

40. A system according to claim 36, wherein said plurality of telephone sets perform speech communication through a speech communication channel and receive the control signal through a control channel to display whether or not said data communication means is in data communication.

41. A system according to claim 40, wherein said line switch means connects said plurality of telephone sets to the line through said speech communication channel.

42. A telephone system comprising:
a plurality of telephone sets each comprising display means, each telephone set performing speech communication through a respective speech communication channel and performing display according to a control signal received through a respective control channel;
line switch means for connecting to a line either of data communication means and the speech communication channels; and
transmission means for transmitting in parallel to the control channels the control signal representing whether or not said data communication means is in data communication,
wherein each said telephone set displays whether or not said data communication means is in data communication, according to the control signal received from said transmission means through the respective control channel.

43. A system according to claim 42, wherein said plurality of telephone sets which receive the control signal display whether or not said data communication means is in data communication, simultaneously.

44. A system according to claim 42, wherein all of said plurality of telephone sets simultaneously display whether or not said data communication means is in data communication.

45. A system according to claim 42, wherein said plurality of telephone sets are respectively connected to two kinds of lines, one kind being allocated to said speech communication channel and the other being allocated to the control channels.

46. A system according to claim 42, wherein said data communication means performs facsimile communication.

47. A communication system comprising:
a plurality of telephone sets; and
a data communication apparatus further comprising:
data communication means,
connection control means for connecting to a communication partner either of said plurality of telephone sets and said data communication means, and
selection means for selecting from said plurality of telephone sets one telephone set corresponding to data communication performed by said data communication means and transmitting a selection signal to said one telephone set,
wherein said plurality of telephone sets are respectively connected to said data communication apparatus through communication channels and control channels, and said telephone sets performing speech communication through said communication channels and said one telephone presents a display in response to the selection signal received through the control channels.

48. A system according to claim 47, wherein said data communication means performs a facsimile communication.

49. A system according to claim 47, wherein said selection means selects said telephone set in response to a dial signal from a data communication partner of said data communication means.

50. A system according to claim 47, wherein said plurality of telephone sets are respectively connected to said data communication apparatus through two kinds of lines, one kind being allocated to said speech communication channel and the other being allocated to said control channel.

51. A system according to claim 47, wherein said selection means selects said telephone set in response to data received by said data communication means.

52. A communication system comprising:
a data communication apparatus for performing data communication; and
a plurality of telephone sets for performing speech communication, respectively,
wherein said data communication apparatus further comprises:
data communication means, and
output means for outputting in parallel to said plurality of telephone sets information relating to a data communication of said data communication means, and
wherein each of said plurality of telephone sets further comprises:
speech communication means for performing speech communication through a speech communication line, and
display means for presenting a display in response to the information output from said output means through a control line.

53. A system according to claim 52, wherein all of said plurality of telephone sets simultaneously perform the display according to the data information of said data communication means.

54. A system according to claim 52, wherein said data communication means further comprises judgment means for judging an identity of a data communication partner in response to received data, and said output means outputs a result of judgment performed by said judgment means to said plurality of telephone sets.

55. A system according to claim 52, wherein said data communication apparatus further comprises storage means which stores the data received by said data communication means, and said output means outputs whether said storage means has the stored data.

56. A system according to claim 52, wherein said data communication means further comprises control means for performing an exchange control of said plurality of telephone sets.

57. A system according to claim 52, wherein said data communication means performs a facsimile communication.

58. A system according to claim 52, wherein each of said display means displays information relating to a data communication partner of said data communicating means.

59. A system according to claim 58, wherein each of said display means displays a telephone number or name of said communication partner.

60. A system according to claim 52, wherein said plurality of telephone sets to which the information from said output means is input in parallel perform simultaneously the display in response to that information.

61. A system according to claim 52, wherein each of said display means displays whether said data communication means is engaged in the data communication.

62. A system according to claim 52, wherein each of said display means displays a communication mode of said data communication means.

63. A system according to claim 52, wherein at least one of said plurality of telephone sets further comprises key input means, and said data communication means further comprises data communication control means which controls said data communication means in response to a key input from said key input means.

* * * * *

UNITED STATES PATENT AND TRADEMARK OFFICE
CERTIFICATE OF CORRECTION

PATENT NO. : 5,093,857
DATED : March 3, 1992
INVENTOR(S) : TAKEHIRO YOSHIDA, ET AL.

It is certified that error appears in the above-identified patent and that said Letters Patent is hereby corrected as shown below:

COLUMN 4

Line 43, "is decoder 44" should read --is input to the decoder 44 through a signal line 42a. The decoder 44--.

COLUMN 5

Line 40, "nit 52" should read --unit 52--.

COLUMN 9

Line 17, "for the control" should read --for the telephone sets and the fax machine is determined by control--.

COLUMN 10

Line 39, "switch 42" should read --switch 142--.

COLUMN 12

Line 57, "220" should read --202--.
Line 64, ""0"." should read --"0"--.

COLUMN 13

Line 10, "line 224a" should read --line 233a--.

UNITED STATES PATENT AND TRADEMARK OFFICE
CERTIFICATE OF CORRECTION

PATENT NO. : 5,093,857
DATED : March 3, 1992
INVENTOR(S) : TAKEHIRO YOSHIDA, ET AL.

Page 2 of 2

It is certified that error appears in the above-identified patent and that said Letters Patent is hereby corrected as shown below:

COLUMN 19

Line 26, "sets" (both occurrences) should read --set--.
    Line 27, "reselected" should read --the selected--.

Signed and Sealed this

Third Day of August, 1993

Attest:

MICHAEL K. KIRK

Attesting Officer     Acting Commissioner of Patents and Trademarks